US012567118B2

(12) United States Patent　　　　(10) Patent No.:　US 12,567,118 B2
Ward　　　　　　　　　　　　　　　(45) Date of Patent:　　　　Mar. 3, 2026

(54) STRATEGIC OPPORTUNITY CHARGING FOR ON-ROUTE ELECTRIC VEHICLES

(71) Applicant: InductEV Inc., King of Prussia, PA (US)

(72) Inventor: Matthew L. Ward, Exton, PA (US)

(73) Assignee: Induct EV Inc., King of Prussia, PA (US)

( * ) Notice: Subject to any disclaimer, the term of this patent is extended or adjusted under 35 U.S.C. 154(b) by 72 days.

(21) Appl. No.: 18/401,267

(22) Filed: Dec. 29, 2023

(65) Prior Publication Data

US 2024/0221103 A1　　　Jul. 4, 2024

Related U.S. Application Data

(63) Continuation-in-part of application No. 18/131,189, filed on Apr. 5, 2023.
(Continued)

(51) Int. Cl.
　　*G06Q 50/40*　　　　(2024.01)
　　*G01C 21/34*　　　　(2006.01)
　　　　　　(Continued)
(52) U.S. Cl.
　　CPC ......... *G06Q 50/40* (2024.01); *G01C 21/3438* (2013.01); *G01C 21/3469* (2013.01); *G06Q 50/06* (2013.01); *G07C 5/004* (2013.01)
(58) Field of Classification Search
　　CPC .............. G01C 21/343; G01C 21/3438; G01C 21/3469; G06Q 50/06; G06Q 50/40; G07C 5/004
　　See application file for complete search history.

(56) References Cited

U.S. PATENT DOCUMENTS 10,591,912 B2 *　3/2020　Pedersen ................... G08G 1/13
10,705,539 B2 *　7/2020　Pedersen ............... G05D 1/0291
(Continued)

FOREIGN PATENT DOCUMENTS

CN　　　112054545 A　　12/2020
FR　　　　3096315 A1 *　11/2020　.............. B60L 58/12
(Continued)

OTHER PUBLICATIONS

International Search Report and Written Opinion received in Patent Cooperation Treaty Application No. PCT/US2023/017757, dated Sep. 14, 2023.
(Continued)

*Primary Examiner* — Babar Sarwar
(74) *Attorney, Agent, or Firm* — Michael P. Dunnam; CM Law LLP

(57)　　　　　　ABSTRACT

Electric vehicles (EVs) for pick-up and delivery services using opportunity charging are routed in response to a task request for package or person pick-up and drop-off. A candidate EV for the task is determined based on a preliminary route analysis of routes between the pick-up and drop-off locations including an estimate of point-to-point travel time and electrical power consumption for each candidate EV. The candidate EVs are winnowed by determining which candidate EV is available during a time window of service that has sufficient state of charge to reach at least the pick-up location. Routing calculations are performed for each remaining candidate to develop an individual route between the pick-up location and the drop-off location and a predicted power consumption for the individual route. A candidate EV is assigned to service the task request that has sufficient state of charge, with minimal recharging delay, to meet the predicted power consumption for its individual route.

20 Claims, 16 Drawing Sheets

Related U.S. Application Data

(60) Provisional application No. 63/436,419, filed on Dec. 30, 2022.

(51) Int. Cl.
     *G06Q 50/06*       (2024.01)
     *G07C 5/00*        (2006.01)

(56)                    References Cited

U.S. PATENT DOCUMENTS

| | | | | |
|---|---|---|---|---|
| 10,718,630 | B2 * | 7/2020 | Rahbari Asr | G08G 1/202 |
| 12,128,922 | B2 * | 10/2024 | Winter | B60W 60/0011 |
| 2013/0073327 | A1 * | 3/2013 | Edelberg | G06Q 10/0631 |
| | | | | 705/7.13 |
| 2013/0285608 | A1 | 10/2013 | Jikihara | |
| 2014/0142770 | A1 * | 5/2014 | Sellschopp | B60L 58/12 |
| | | | | 700/291 |
| 2015/0226572 | A1 * | 8/2015 | North | B60L 53/68 |
| | | | | 701/400 |
| 2015/0298565 | A1 * | 10/2015 | Iwamura | G06Q 10/04 |
| | | | | 701/22 |
| 2016/0311423 | A1 * | 10/2016 | Storm | B60L 50/40 |
| 2017/0088000 | A1 * | 3/2017 | Payne | B60L 53/64 |
| 2017/0176195 | A1 | 6/2017 | Rajagopalan et al. | |
| 2017/0282736 | A1 * | 10/2017 | Goei | G01C 21/3469 |
| 2018/0060776 | A1 * | 3/2018 | Ahmed | G07C 5/0808 |
| 2018/0105175 | A1 * | 4/2018 | Muller | B60W 50/082 |
| 2018/0136651 | A1 * | 5/2018 | Levinson | G05D 1/0027 |
| 2018/0143035 | A1 * | 5/2018 | Ricci | B62D 15/0265 |
| 2019/0163150 | A1 | 5/2019 | Wong et al. | |
| 2019/0217736 | A1 | 7/2019 | Donnelly et al. | |
| 2019/0285425 | A1 * | 9/2019 | Ludwick | G06Q 10/0631 |
| 2019/0294159 | A1 * | 9/2019 | Pedersen | B60W 50/00 |
| 2020/0218255 | A1 * | 7/2020 | Pedersen | G05D 1/6987 |
| 2020/0262305 | A1 * | 8/2020 | Chakraborty | B60L 53/57 |
| 2020/0284599 | A1 * | 9/2020 | Cyr | G01C 21/3469 |
| 2020/0338999 | A1 * | 10/2020 | Press | H04W 4/027 |
| 2021/0118070 | A1 * | 4/2021 | Taber, Jr. | G06Q 40/04 |
| 2021/0402889 | A1 * | 12/2021 | Logvinov | B60L 53/62 |
| 2022/0227248 | A1 * | 7/2022 | Viswanathan | B60L 53/30 |
| 2022/0228877 | A1 * | 7/2022 | Feldman | G01C 21/3476 |
| 2023/0153720 | A1 * | 5/2023 | Medisetty | G06Q 10/02 |
| | | | | 705/7.25 |
| 2023/0349705 | A1 * | 11/2023 | Lerner | G01C 21/3469 |
| 2023/0406124 | A1 | 12/2023 | Murahari et al. | |
| 2024/0019255 | A1 * | 1/2024 | Kim | G06Q 10/047 |
| 2024/0019260 | A1 * | 1/2024 | Ravishankar | G01C 21/3469 |
| 2024/0295407 | A1 | 9/2024 | Lei | |

FOREIGN PATENT DOCUMENTS

| | | | | |
|---|---|---|---|---|
| WO | WO-2015041366 | A1 * | 3/2015 | B60L 53/62 |
| WO | WO-2018102475 | A1 * | 6/2018 | G01C 21/3407 |

OTHER PUBLICATIONS

International Search Report and Written Opinion received in Patent Cooperation Treaty Application No. PCT/US2023/086292, dated Mar. 18, 2024.

International Search Report and Written Opinion received in Patent Cooperation Treaty Application No. PCT/US2023/086560, dated Apr. 29, 2024.

* cited by examiner

1200

| | |
|---|---|
| 1210 | CREATE DATA MODEL BASED ON HISTORICAL DATA, SIMILAR ROUTES, NEAR-REAL-TIME SENSOR DATA, AND THIRD PARTY DATA RELATING TO ENVIRONMENT, EV, POWER USAGE, CHARGER, CHARGING SESSIONS, ENERGY COST DATA, TRAFFIC, AND ROUTE DATA OR A SINGLE EV OR FLEET OF EVs |
| 1220 | PROCESS COLLECTED DATA WITH DATA MODEL TO PROVIDE INITIAL ESTIMATE OF TOTAL COST PER DISTANCE (TCD) OF TRAVEL OVER ROUTE SEGMENTS |
| 1230 | OPTIMIZE ROUTE AND CHARGING ALONG ROUTE SEGEMENTS TO REDUCE TCD FOR ROUTE |
| 1240 | COLLECT DATA RELATING TO THE ENVIRONMENT, EV, POWER USAGE, COST OF POWER, TIME OF TRAVEL, ETC WHILE TRAVELING ROUTE SEGMENT |
| 1250 | CALCULATE TCD FOR CURRENT ROUTE SEGMENT USING DATA MODEL BASED ON ENVIRONMNET, EV, PWER USAGE, COST OF POWER, TIME OF TRAVEL, TRAFFIC, ETC FROM COLLECTED DATA |
| 1260 | UPDATE ROUTE FOR THE NEXT ROUTE SEGMENT BASED ON VARIATIONS IN THE ENVIRONMENT, EV, POWER USAGE, TIME OF TRAVEL, TRAFFIC, ETC, AND INCLUDE WHEN/WHERE TO CHARGER ALONG ROUTE SEGMENT FOR OPTIMAL TCD. |

FIG 12

STRATEGIC OPPORTUNITY CHARGING FOR ON-ROUTE ELECTRIC VEHICLES

CROSS REFERENCE TO RELATED APPLICATIONS

This application is a continuation-in-part of U.S. patent application Ser. No. 18/131,189 filed Apr. 5, 2023, which claims the benefit of U.S. Provisional Application No. 63/436,419 filed Dec. 30, 2022, which are incorporated by reference as if fully set forth herein.

FIELD OF INVENTION

The present disclosure relates generally to wireless power transfer, and more specifically to devices, systems, and methods related to wireless power transfer to remote systems such as vehicles including batteries. More particularly, the present disclosure relates to achieving lowest total cost of travel for electric vehicles on known routes using wireless power transfer opportunity charging.

BACKGROUND

Increasingly, transit, drayage, taxis and delivery vehicles are evolving to electric traction motor and battery power.

A transit bus is a fixed route public transportation service which operates according to a set (pre-published) schedule which includes arrival and departure times for geographically distributed passenger stops where passengers may enter or exit the vehicle. A terminal, or terminus, is where a transit route starts or ends and where drivers may dismount briefly or be exchanged. A terminal may also include a stop where passengers board and alight from vehicles. A bus depot may be a terminal that serves bus passengers (a stop), but also can be the nexus between different bus routes and bus lines. The depot can also provide battery charging, vehicle maintenance, vehicle storage, and refreshment, relief, and staging for bus drivers.

Drayage is the process of transporting goods over short distances. A drayage vehicle operates in a bounded area, altering its route as needed to pick-up, move, and deliver freight among the multiple destinations.

Delivery vehicles may be operated in several ways depending on the service type. A package delivery vehicle may start full at a loading dock, depot, or terminal and then deliver to a single or multiple drop-off locations over public roads. The package vehicle may also load at any drop-off location or at pre-set pick-up locations in a service area or along a pre-set route. Delivery routes may be fixed, malleable (with both pre-set stops and new stops added during a delivery run), or ad hoc (with the next stop determined during or after completion of current inter-stop run). A taxi passenger service or ride-share is a good example of a fully ad hoc delivery service.

Static Opportunity charging of electric vehicles (EVs) during brief stops or at vehicle loading, unloading, and package sorting is an important application of wireless power transfer (WPT). EVs may be human operated, use driver-assistance automation, or be fully autonomous.

WPT offers fully automatic power delivery to the EV without need for a physical (wired) power connection. With WPT, the driver has no need to exit the vehicle to attach a power cable (if exiting the vehicle for or while charging is permitted at all). Also known as Inductively Coupled Power Transfer, WPT acts as an open core transformer with a primary (ground-side) coil and a secondary (vehicle-side)

coil to transfer power over an air-gap in accordance to Faraday's first law of electromagnetic induction.

BRIEF DESCRIPTION OF THE DRAWING(S)

The foregoing and other beneficial features and advantages of the invention will become apparent from the following detailed description in connection with the attached figures, of which:

FIG. 12 is a flow chart of a sample method for strategic opportunity charging in an example configuration.

DETAILED DESCRIPTION OF THE PREFERRED EMBODIMENT(S)

Figure 1:
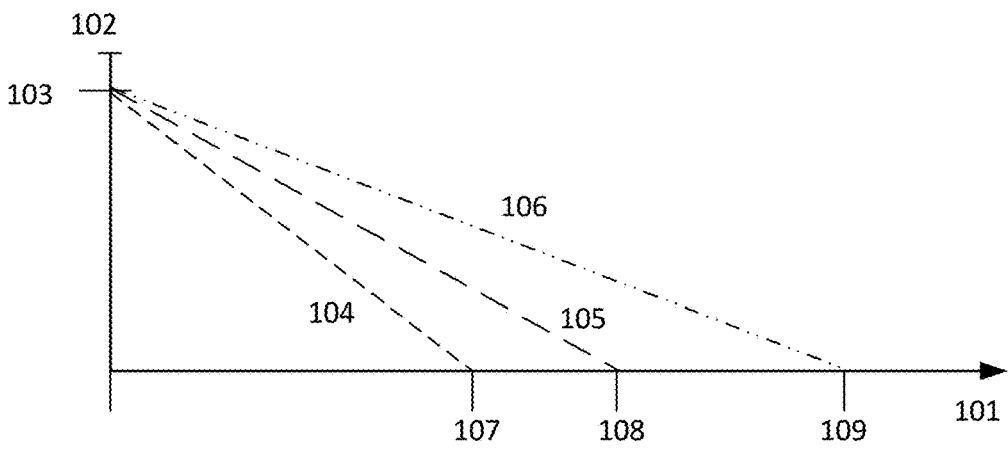
FIG. 1 is a chart graphically depicting examples of EV range versus battery state of charge (SoC) from a starting charge.

A detailed description of illustrative embodiments is described with reference to FIGS. 1-26. Although this description provides a detailed description of possible implementations, it should be noted that these details are intended to be exemplary and in no way delimit the scope of the inventive subject matter.

Strategic Opportunity Wireless Charging allows for increased deployment of electric transit vehicles without range or time limitations. Electric buses have zero tailpipe emissions, are quieter, and with Strategic Opportunity Wireless Charging can function without being taken off-line, or off-route, for refueling or recharging. EV transit vehicles are key to cleaner urban air, reduced traffic noise, and decarbonization. Strategic Wireless Opportunity is key to mass adoption and eventual automation of transit.

Electric Vehicles (EV) use electric traction motors and batteries in place of internal combustion engines and chemical fuels. EV is used here for both battery electric vehicles (BEV) and the various hybrid battery and internal combustion engine vehicles (HBEV). Batteries or Battery Packs nominally include rechargeable chemical batteries, but also could include one or more of a capacitor bank, a reversable fuel cell, a solid-state battery or a hybrid combination of the aforementioned. Improvements in energy storage technology (e.g., solid state batteries, hybrid battery and ultracapacitors) can also be used to take advantage of quick opportunity charging using high power wireless power transfer.

In a typical example, an EV battery pack is made up of electrochemical battery cells. The longevity of the commonly used rechargeable Lithium-Ion battery cell is commonly quoted at 300 to 500 charge cycles. One charge cycle is the period of use from fully charged, to fully discharged, and then back to fully recharged again.

These rechargeable Lithium-Ion batteries have a limited life and will gradually lose their capacity to hold a charge. This loss of capacity (battery aging) is irreversible. As the battery loses capacity, the length of time it will power the bus is reduced, resulting in more a limited travel range, and run time.

Much has been written about the ability of wireless opportunity charging to reduce the size of the required battery and extend the range of electric vehicles. The ability of strategic wireless opportunity charging to preserve Lithium ion battery lifespan by keeping the rechargeable battery charge level between high and low state of charge (SoC) thresholds has been demonstrated in the field to extend battery lifespans. The charge rate and the battery temperature before charging and battery temperature during charging are also considerations in Lithium-Ion battery lifespans. Solid State batteries that can be charged and discharged 1000's to 10,000 times can still benefit from controlled charging levels, charging rates, and battery temperature considerations. In mixed fleets, some EVs may contain Lithium-Ion batteries and other solid state batteries (in some cases, the same EV may have multiple battery technologies). Such mixed fleets would benefit from the individualization of EV charging and performance data for modeling and machine learning.

Wireless opportunity charging describes how electric vehicles take advantage of wireless chargers deployed in their service or along their route. Since opportunity-charged EVs do not have "dead-head" time heading back to a depot or garage to charge, both time and battery charge can be saved for use in serving the route.

Opportunity charging allows for use of smaller batteries in EVs with resulting lowered weight and beneficially longer range or greater cargo capacity at range.

Opportunity charging also can be used to maintain the battery SoC between upper and lower thresholds to increase the longevity of the battery. An EVs battery pack can have a high cost of replacement and an increase in battery lifespan can lower total cost of distance (TCD).

Opportunity charging allows increased safety and comfort for drivers since there is no need to leave the vehicle at night or in inclement weather conditions as a plug-in charger with wires that require connection. Automatic opportunity charging also enables the handicapped to use electric vehicle charging.

In the following illustrative examples, electrically powered buses serving short to medium distance routes as part of a publicly pre-scheduled bus service local or regional network are referred to as 'transit buses'. For a transit bus, a terminal, or terminus, is where a transit route starts or ends and where drivers may dismount briefly or be exchanged. A terminal may also include a stop where passengers board and alight from vehicles. A bus depot is a terminal that includes maintenance and vehicle storage facilities. A stop is any transit stop where passengers may board and disembark from the transit vehicles.

For the transit bus (and indeed for any vehicle using the strategic opportunity charging protocols and system), first party data is defined as sent from sensors mounted on the EV. Second party data is defined as sent from other EVs or from sensors at instrumented stations (e.g., a charging station). Third party data is acquired from outside sources that are not the original collectors of that data. Third party data may be aggregated from multiple sources. Examples of third party data include maps, traffic conditions, and weather information.

All electric vehicles (EVs), which includes Battery EVs (BEV) and hybrids, have a range which can be estimated from the battery state of charge (SoC). The vehicle wear and tear, battery lifespan reduction, and price of power are all factors in the TCD (total cost per distance (mile or km)). When the price of power varies either over the route or over the service day, then an additional, variable factor of cost per watt becomes a factor in TCD.

A fleet management system, as defined herein, can include fleet energy management with each vehicle using radio data links to report sensor data and coordinate charging operations with the dispatch office controller. This coordination and information awareness extends over the opportunity charging capability as distributed over space (geographically and by travel route) and over time to reduce total fleet operating costs.

Multiple buses, geographically distributed charger sites, charger sites collocated chargers with high-use businesses or locations, and use of a mix of private and public usage charging sites are all contemplated and used to reduce the total cost of distance for individual EVs and for fleets of EVs via the fleet management system.

The collection of, communication of, storage of, monitoring of, and analysis of environmental, vehicle, charger, and charging session data over a single EV or over a fleet or multiple fleet of electric vehicles can be used both to enhance or optimize existing services as well as deliver new services based on analysis of the collected data. Use of historical data can be used to make better estimates for specific routes, vehicles, and drivers.

One such service is reduction in total cost of travel. Use of collected data can be used to guarantee all vehicles in an EV transit fleet complete service routes at a minimal cost by optimizing charging for individual EVs as well as for the entire fleet. This cost minimization is achieved with near-real-time data, models populated using past collected data, and knowledge of energy costs and of chargers located in different geographic areas with potentially limited power for charging available at each charger site or station.

The fleet management application used for cost minimization may optimize cost of travel for a single EV or for an entire fleet. Using individual EVs cost optimization as a goal, each EV may be optimized for potential local minimum cost of travel based on predictions using data collected from the fleet or from multiple fleets.

Using a fleet level goal, fleet optimization is designed for a global minimum total cost which might be different than the local optimization algorithm designed for minimization of cost for an EV bus. Trade-offs in the fleet management application modeling may accept charging of selected EVs in the fleet at higher cost of power over a first time period to gain a better overall outcome of the system instead of charging of those vehicles during a second time period when the cost of charging is lower to achieve an overall lower cost for the fleet or to manage power resources to minimize impact to the utility grid when charging.

Electric vehicles (EVs) for pick-up and delivery services using opportunity charging also may be routed in response to task requests for package or person pick-up and drop-off. A candidate EV for the task may be determined based on a preliminary route analysis of routes between the pick-up and drop-off locations including an estimate of point-to-point travel time and electrical power consumption for each candidate EV. The candidate EVs may be winnowed by determining which candidate EV is available during a time window of service that has sufficient state of charge to reach at least the pick-up location. Routing calculations are performed for each remaining candidate to develop an individual route between the pick-up location and the drop-off location and a predicted power consumption for the individual route. A candidate EV is assigned to service the task request that has sufficient state of charge, with minimal recharging delay, to meet the predicted power consumption for its individual route.

Efficiency is the ability to do something or produce something without wasting materials, time, or energy. In the case of transit electric vehicle's efficiency may include electricity usage versus EV range, vehicle cost, and/or extension of battery pack lifespan dependent on the scenario.

The trove of $1^{st}$, $2^{nd}$, and $3^{rd}$ party data collected or otherwise obtained is well suited to both statistical analysis and machine learning (ML) techniques. Statistical analysis can be used to determine trends, patterns, and relationships (both causal and correlative) using the labeled quantitative and categorical data. Since the data is well-labeled, supervised learning algorithms for ML are well suited to be used when a specific goal or optimization is desired. In some cases, the data can be used with an unsupervised learning algorithm to cluster data and identify patterns, associations, or anomalies from the data.

FIG. 1

FIG. 1 is a chart graphically depicting examples of EV range versus battery SoC from a single charge. The x-axis shows the range 101 while the y-axis shows the SoC 102 with the starting point of 103. In this example, simple linear models of travel are used to illustrate the concepts.

In a first example, the EV starts with a starting point SoC 103 (e.g., 100% SoC). As the EV travels 104 its SoC drops until it reaches 0% SoC at range 107.

In a second example, the EV starts with a starting point SoC 103 (e.g., 100% SoC). As the EV travels 105 its SoC drops until it reaches 0% SoC at range 108.

In a third example, the EV starts with a starting point SoC 103 (e.g., 100% SoC). As the EV travels 106 its SoC drops until it reaches 0% SoC at range 109.

The factors in determining EV range 107, 108, 109 can include vehicle characteristics, battery pack characteristics, environmental factors, load carried, terrain traversed, and driver abilities.

Vehicle characteristics include the make, model, manufacturer, age, mileage, and state of repair of the vehicle. Tire condition and tire selection are also considerations. Aerodynamics (air drag) is considered a vehicle characteristic.

Battery pack characteristics include make, model, manufacturer, capacity, battery aging (both time-wise and accelerated aging due to battery cycling), past battery usage and past inter-journey battery storage SoC. Data from sensors for the monitoring of the temperature of individual battery cells and the voltage levels of individual battery cells are expected to be available near-continuously via the vehicle's Battery Management System (BMS). The BMS is provides oversight and management of the EV's battery pack. The battery pack nominally consists of an array of battery cells, configured and interconnected to deliver the need voltage and current needed. The BMS monitors the battery pack sensors (e.g., for current, voltage, temperature) and communicates with EV electrical subsystems and external chargers (such as a WPT charger). The BMS maintains the battery pack operational profile and protects against over-discharge, over-heating, and over-charging. The BMS may also optimize battery performance and lifespan by controlling the charging rate and SoC.

Environmental factors include weather, air temperature, and air pressure. The air temperature not only affects the battery state of charge, but also the electrical load needed for interior climate control (heating and cooling) for passengers and/or cargo as well as the vehicle systems (e.g., cooling the battery pack). Day versus nighttime travel may also affect range. Weather conditions (e.g., rain, snow, winds) may also affect range versus SoC. Lighting, such as headlights, interior and exterior lighting place a variable load on the battery pack. In colder climes, especially when evening darkness requires additional safety lighting, the combined heating (for passengers and the battery pack) and lighting loads can require a substantial fraction of the battery capacity, necessitating additional power transfer (either longer charging times or charging at higher power). Battery SoC safety margins may also require recalibration to preserve battery lifespan.

Environmental factors are expected to be available from charger site sensors, vehicle mounted sensors, and via third parties such as public weather stations and feeds to the dispatch server.

Load carried, either passengers or cargo, affects power consumption over the route with heavier loads decreasing range versus SoC. Both rolling friction and acceleration are affected by load carried.

Terrain traversed includes inclination and declination of the route traveled as well as curves, speeds, stops, and traffic conditions. Traffic conditions may be collected from a third-party service via an application programming interface (API) at the dispatch server. Terrain may be a large factor in power consumption over a route segment since uphill slopes will require additional power to surmount while route segments with generally downhill slopes will both ease power consumption and may store additional power due to regenerative braking.

Driver abilities include the conservation of battery resources by traffic lane selection, smooth acceleration, and smooth deceleration (braking). "Driver" here includes use of automated driver assistance software packages and autonomous driving systems.

FIG. 2

Figure 2:
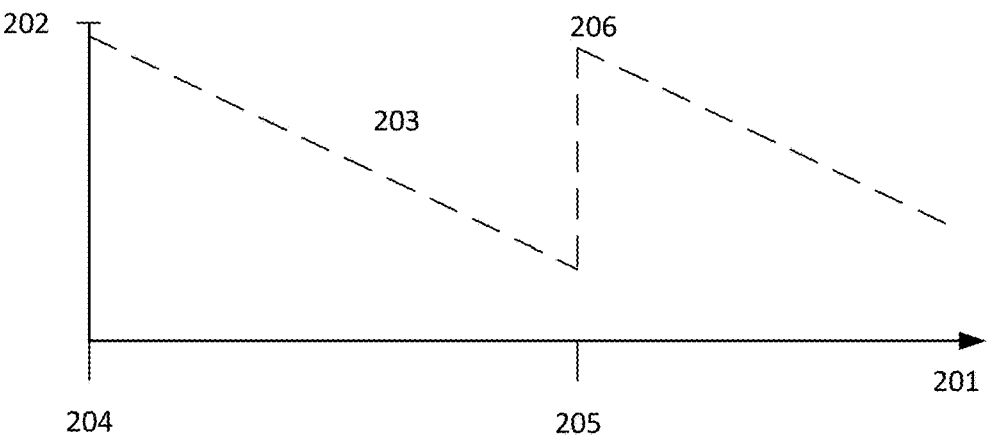
FIG. 2 is a chart graphically depicting an example of EV range extension by mid-route recharging.

FIG. 2 is a chart graphically depicting an example of EV range extension by mid-route recharging. The x-axis shows the range 201 while the y-axis shows the SoC 202. In this example, a simple (linear) model of travel is used to illustrate the concept. In a first mid-range recharge example, the EV starts with a first SoC 202 at the start 204 of the travel. As the EV travels, the EV SoC level 203 decreases. At a charging point 205, the EV is recharged, and the recharged EV SoC 206 is then used to continue the journey over the range 201.

FIG. 3

Wireless inductive charging allows for connectionless charging of EVs. Opportunity charging refers to charging an electric vehicle for short periods (and for smaller increments in SoC) throughout the journey. This partial recharging strategy contrasts with the recharging the EV all at once as shown in FIG. 2.

Figure 3:
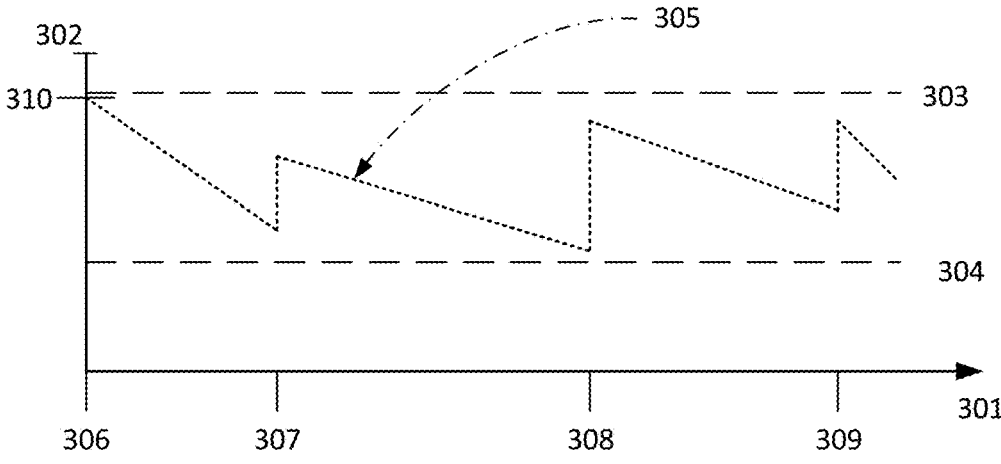
FIG. 3 is a chart graphically depicting an example of range extension and battery lifespan extension by strategic opportunity charging.

FIG. 3 is a chart graphically depicting an example of range extension and battery lifespan extension by strategic opportunity charging. The x-axis shows the range 301 while the y-axis shows the SoC 302. In this example, a simple (linear) model of travel is used to illustrate the concept. In this example of strategic static opportunity charging, the EV not only is partially recharged at every temporary stop 306, 307, 308, and 309, but the SoC is maintained between an upper SoC threshold 303 and a lower SoC threshold 304. The SoC profile 305 over the traveled route is shown varying in slope (in this simplified model) showing the differing consumption of power over route segments (i.e., between stops with opportunity chargers).

The upper 303 and lower 304 SoC thresholds are designed to increase the EV battery life. Only a single set of thresholds are shown here, but multi-level thresholds may be set for extending range while minimizing battery lifespan impact. Of course, the physical upper threshold 303 of 100% SoC and a lower threshold 304 of 0% are always available for range extension (e.g., for emergency use) at the expense of battery lifespan.

In the FIG. 3 example, the starting point SoC 310 is shown as just below the upper battery charge threshold 303.

In some cases the starting point SoC 310 may be above (e.g., 100% SoC) or well below (e.g., 40%) if brought from long-term storage.

In one configuration, selecting upper and lower thresholds and using opportunity charging to maintain the state of charge between the selected thresholds, the useful life of a Lithium-Ion battery pack can be extended. Monitoring of temperature and voltage of individual batteries and varying charge rate to keep both below (and above) selected thresholds also can contribute to maximization of battery lifespan.

By knowing the vehicle battery operational thresholds, charger locations, route, time-of-day, current position, traffic level, and estimate time of arrival at the next charger, the decision to charge (and to what SoC level) can be made at or in advance of reaching an WPT opportunity charger. The cost of power from the electrical utility grid also may vary during the time of day or at the WPT charger location.

FIG. 4

Time of Use (TOU) electric rates are a billing arrangement in which the price of electricity changes based on the time of day. TOU rates respond to electricity availability, with more expensive during peak hours demand hours and less expensive during the hours of low demand. These rates are typically static for a time period (week, month, season) to respond to changes in demand.

Figure 4:
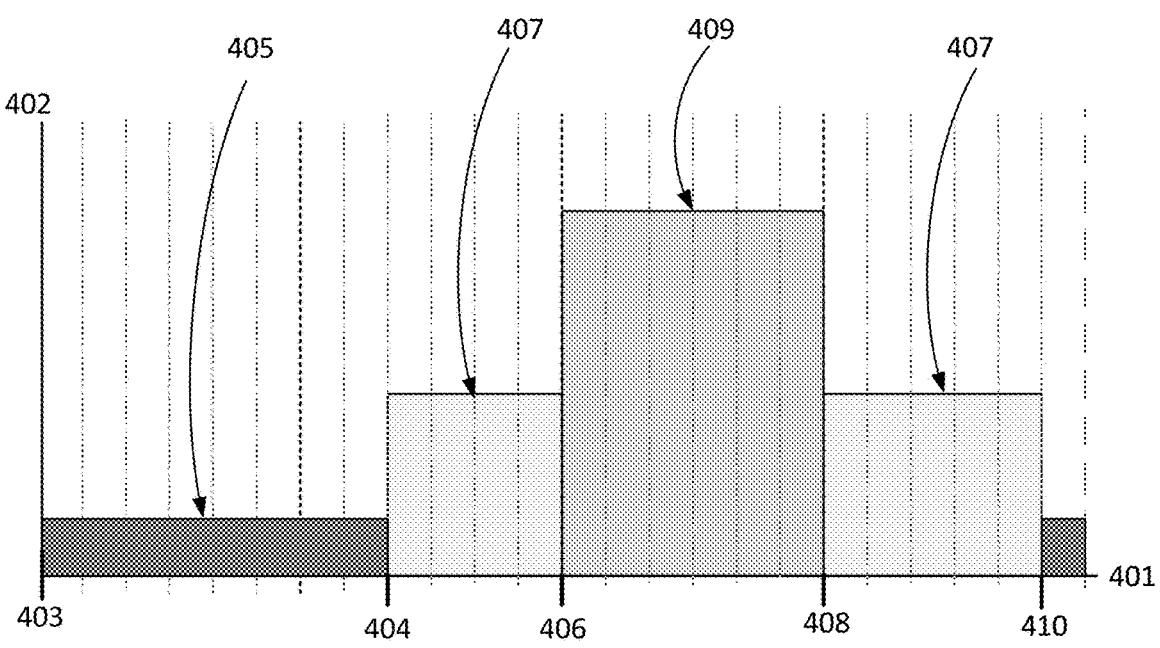
FIG. 4 is a chart graphically depicting the price of power over a 24-hour time period in an example.

FIG. 4 is a chart graphically depicting the price of power over a 24-hour time period in an example. In FIG. 4, the X-axis 401 is the 24-hour day marked in 1 hour segments. The Y-axis 402 shows the price of power for each hour segment. In this illustrative example, starting at midnight 403 on the X-axis 401 and continuing to 8 am 404, the electric utility has the price set to "off-peak" 405. Between 8 am 404 and noon 406, rising demand has the utility pricing set to "mid-peak" or "shoulder" 407. Between noon 406 and 6 pm 408 the utility pricing is set to "peak" 409 during the hours of highest demand. After 6 pm 408 and until 11 pm 410, the decreasing demand has the utility pricing set to "mid-peak" 407. After 11 pm 410, the rates drop back to "off-peak" 405. As can be seen in FIG. 4, the pricing varies with rising and falling demand.

EV charging (per watt) will be cheapest during off-peak hours, most expensive during peak hours. Selective charging of the EV during the day (both the time-of-charge, and level of charging at a charging session) to minimize costs can be accomplished.

Not shown are the weekend TOU rates which can be different from the work-week (e.g., Monday-through-Friday). In some regions, the weekend rate is set to "off-peak".

FIG. 5

Figure 5:
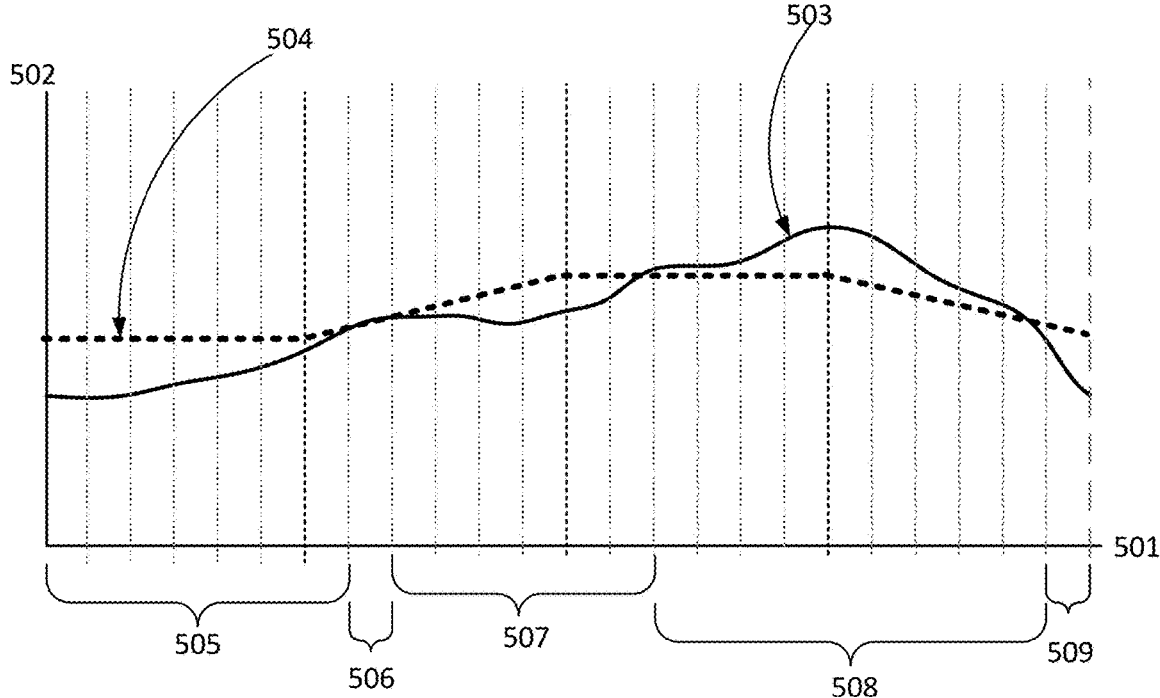
FIG. 5 is a chart graphically depicting the price of power from first and second utilities that share the same geographical market with a deployed WPT system and offer different electric rates based on the hourly time-of-day and power generation capabilities and capacities.

In some regions and markets, competitive utilities may be available. FIG. 5 is a chart graphically depicting the price of power from first and second utilities that share the same geographical market with a deployed WPT system and offer different electric rates based on the hourly time-of-day and power generation capabilities and capacities. As shown in FIG. 5, first and second utilities share the same geographical market with a deployed WPT system and offer different electric rates based on the hourly time-of-day and power generation capabilities and capacities. In FIG. 5, the X-axis 501 is the 24-hour day marked in 1 hour segments. The Y-axis 502 shows the price of power for each hour segment. In this illustrative example, in the first period 505 (midnight to 7 am), the first utility market rates 503 are cheaper. During the second period 506 (7 am-8 am), the rates for both utilities 503 and 504 are roughly equal. The third period 507 (8 am-2 pm) has the first utility rate 503 cheaper. During the fourth period 508 (2 pm-11 pm), the second utility rates 504 are advantageous. Finally, in a fifth period 509 (11 pm-midnight) the first utility offered rates 503 are again preferred.

By selecting service from the cheaper utility during the charging time, the cost of power for EV charging can be reduced. Managing the charging time, duration, and charge level can increase these savings by minimizing charging during the higher cost of power times of day.

Since demand, availability, and cost of electric power may vary considerably on a day-to-day or even hour-to-hour, these all factor into the decision to charge. Information on electric rates can be obtained by from the terms of prior contracts with the local utility, from a data feed from the local the electricity exchange, or the public market spot price for electricity when multiple suppliers feed utility. Examples of electricity markets include the Day-Ahead Energy Market and the Real-Time Energy Market.

FIG. 6

Utility Service Areas

Charger locations may place consecutive chargers on a particular route in different utility service areas where pricing information from multiple sources may need to be obtained and considered on the charging decision. In cases where the charger(s) are owned by a third party (one other than the utility and fleet operator), the price of electricity may need to be obtained from the third party for the estimated charging time.

Figure 6:
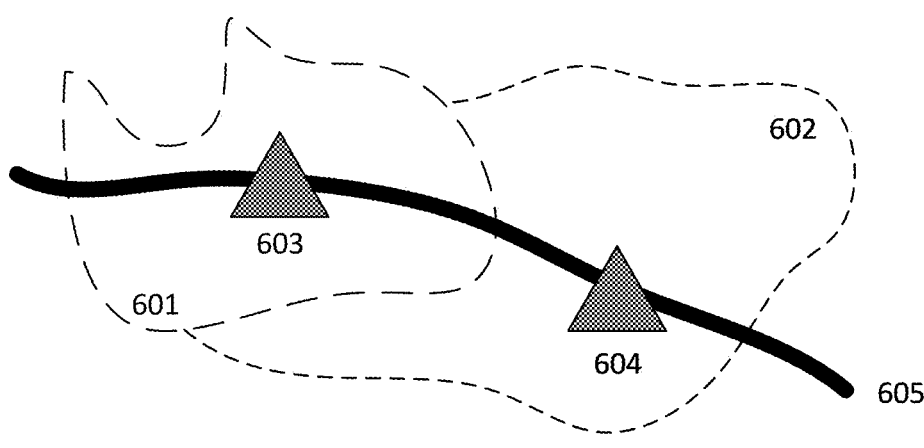
FIG. 6 is a diagram depicting an example where two regions are traversed by an EV route.

FIG. 6 is a diagram depicting an example where two regions 601 and 602 are traversed by an EV route 605. In this example, each region 601 and 602 is served by a different utility, each with different pricing. The WPT opportunity chargers 603 and 604 thus can have a differing cost of power. Using differing charging duration and power levels at each WPT charger 603 and 604 at specific times of day, the total cost of charging for the route can be optimized.

FIG. 7

Figure 7:
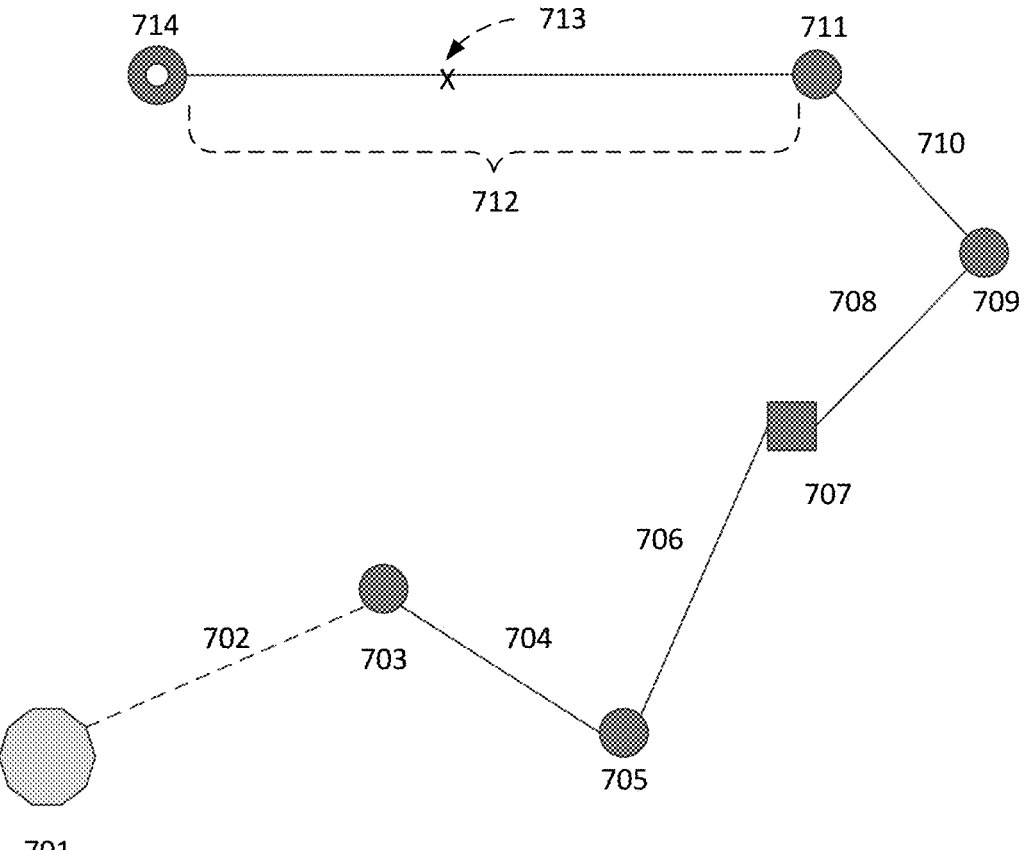
FIG. 7 is a diagram geographically depicting an exemplary distribution of wireless chargers along a bus route.

FIG. 7 is a diagram geographically depicting an exemplary distribution of wireless chargers along a bus route. While recharging may be done at inter-route transit stations or inter-connection stations (e.g., at rail or airport terminals) with longer hold-over times, deployments can include recharge stops located advantageously (e.g., at ranges where the predicted battery SoC is predicted to cross a lower threshold).

Predictive Modeling

By obtaining the pricing at multiple chargers along the route at the multiple estimated times of arrival, a cost of travel profile for the route may be generated at the start of the day. Based on the upper and lower SoC battery thresholds, a cost optimization can be calculated and recalculated as needed if the original route is departed from or the model fails to predict accurate SoC values. Data used to populate the cost optimization model may include training data from the current route, the current fleet, or other fleets using the same or similar electric vehicles. In some cases, a substantial cost difference in charging either from one location to another, or from one time to another can engage a second set of battery SoC thresholds.

Recalculation of the modeled cost of travel can include deviances from the schedule both for early arrivals and late arrivals. In cases of early arrival, additional charging time is available for use and may result in a lowered offered charging current. In cases of late arrivals, a higher charging current may be made available to shorten charging time over the potentially foreshortened stop duration.

A system to enable continuous operation of electric fleet vehicles by using on-route wireless charging is described. Vehicle SoC is kept at optimal levels to promote battery health and longevity while also taking into account the price of electricity to optimize the cost to operate the vehicle.

Sensor data is collected repeatedly throughout operation during route charging sessions to facilitate dynamic charging models that take into account electric vehicle type (make, model, year), environmental factors (e.g., weather, traffic conditions), driver behavior and drive-train and battery pack health that affect the performance of wireless charging and the operation of the vehicle.

Data collected across EV transit bus fleets is used to automatically optimize models to increase or decrease charging power based on these factors to enable vehicles to remain in operation indefinitely while also maintaining optimal SoC across the fleet at the lowest cost possible in terms of both battery lifespan and cost of electricity.

For each electric vehicle type (i.e., make, model, manufacturer, year, battery pack) or EV class, at least one minimum SoC threshold is established. The minimum SoC is dynamic and may be based on: a) minimum SoC to limit battery damage (lifespan reduction), b) minimum SoC required to reach the next two charging stations in a route, c) minimum SoC need to complete a route without charging, d) minimum SoC calculated to abort the route and to reach the depot, e) SoC charge when the route is started, and f) a manually set SoC threshold.

In a minimum power regime, the EV is only allowed to charge to the predictive value of SoC for each stop with a wireless charger. This minimum power regime can be altered based on the estimated price of electricity at WPT chargers on the route.

As the recharging network grows and higher power wireless charging service is deployed, wireless opportunity chargers may be placed at more geographic positions where even brief stops can be used for opportunity charging or where charging lanes equipped with dynamic inductive chargers are deployed. Note that both the static and dynamic charging EVs may make use of the near-field communications such as detailed in U.S. Pat. No. 10,135,496; "Near field, full duplex data link for use in static and dynamic resonant induction wireless charging".

FIG. 7 displays one exemplary transit route. The depot 701 is used to house and service the electric transit bus when not in service. The depot 701 may be part of a terminal and passengers may board before departure. Passengers may embark and disembark at each pre-planned stop. Other stops may be introduced ad hoc for passengers to disembark. A first route segment 702 is traveled to bring the bus to the first stop 703 where passengers may embark and disembark. The second route segment 704 brings the bus to the second stop 705 where passengers may embark and disembark. The third route segment 706 brings the bus to the first transfer station 707 where passengers may embark and disembark to travel on another, crossing transit route. The driver may also use this site 707 and opportunity to take a mandated break. Traveling the fourth route segment 708 brings the bus to the fifth stop 709 where passengers may embark and disembark. Traveling the fifth route segment 710 brings the bus to the sixth stop 711 where passengers may embark and disembark. Traveling the sixth route segment 712 brings the bus to the bus station 714 which is the end of route in this example. In this example, the longest route segment 712 contains a charger stop 713 where the bus may briefly stop for charging. The charger stop 713 may alternately be a dynamic opportunity charger where the bus need only drive over the charger equipped road surface without need to stop.

At any of the planned stops 703, 705, 707, 709, 711, and 713, wireless opportunity chargers may be installed. Additional Charger sites (not shown) may be deployed between stops to increase range while keeping SoC within the SoC threshold boundaries.

For electric transit vehicles (e.g., buses), opportunity charging requires charging sites be located on or near the driven routes. Charger placement is initially accomplished by mapping and modeling (using data either collected (via test drives), modeled, or from similar routes and vehicles), of routes with chargers placed at depots and stops (or in some case between stops) where sufficient power may be obtained. For cost reduction, chargers will normally be placed at a subset of stops.

Once the transit system (with attendant data collection, transmission, and analysis) is operational, the collected data may be used to determine if 1) additional charger(s) are required, 2) fewer chargers are needed, or 3) chargers may be decommissioned and moved to another site to better serve the transit fleet in meeting total cost of travel goals.

Where the charger and data infrastructure is shared among multiple fleets, use of travel data from the multiple fleets can be used to rebalance the charger infrastructure to adjust to newly deployed EV transit vehicles, to adjust to changing vehicular traffic patterns, and changes in ridership and routes.

When multiple fleets share the opportunity charging infrastructure, ownership of chargers and payment of charging costs may be accumulated and negotiated between the fleets. In some scenarios, a local or regional authority will own, operate, and service the wireless charger network and ancillary communications and data systems and will apportion cost to the served fleets.

In some cases, wireless chargers owned and operated by non-fleet commercial or governmental operators can be used to supplement the transit wireless charger network.

FIG. 8

Figure 8:
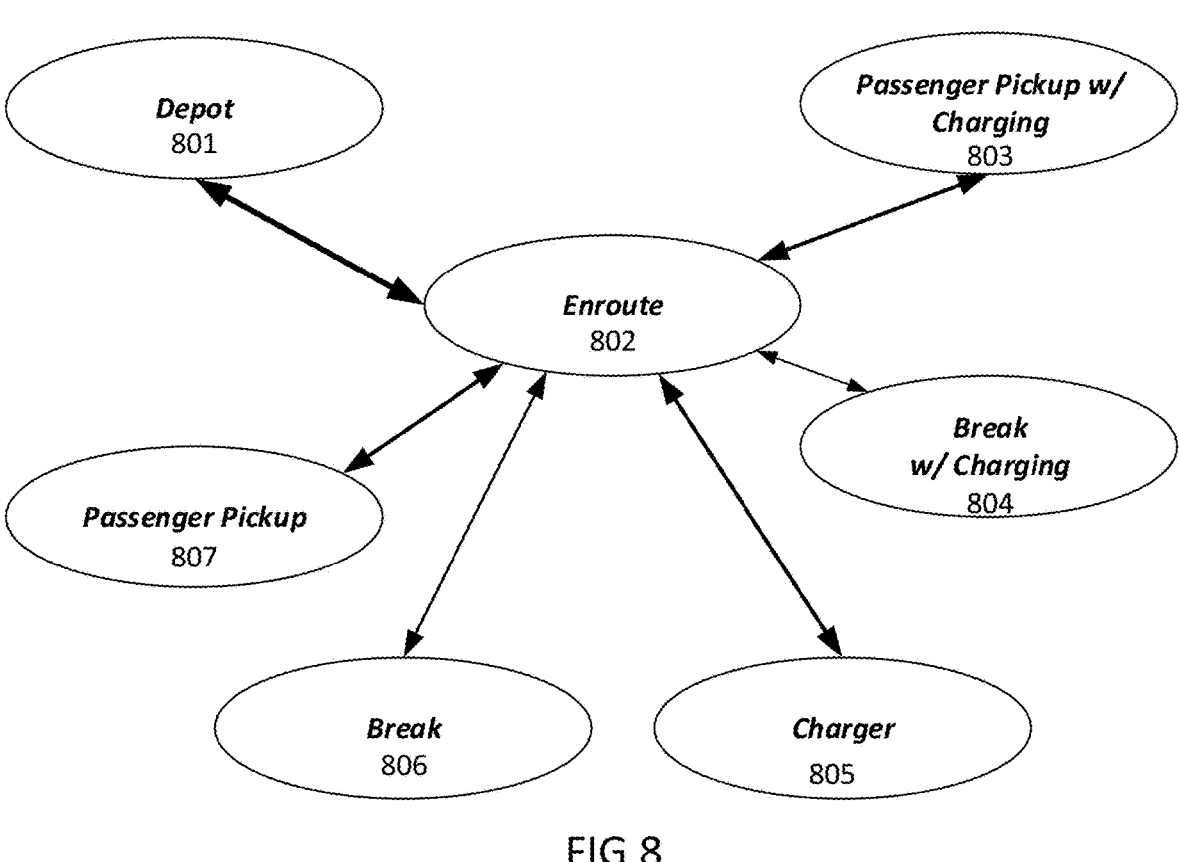
FIG. 8 is a diagram depicting an example state machine for a transit bus with wireless charging.

FIG. 8 is a diagram depicting an example state machine for a transit bus with wireless charging.

The state machine of FIG. 8 illustrates the data collected at different times and events along the electric vehicle route.

The Depot State 801 is encountered at least twice in this example. Once on departure and once on end-of-day. Additional encounters may occur, for example, due to driver shift changes or necessary vehicle maintenance.

At departure from the depot, the bus systems are fully charged (to SoC upper threshold), preheated, cooled, or air-conditioned as necessary for the start-of-day. The vehicle characteristics (e.g., make, model, year) and the driver (or driver software) identity are recorded.

The onboard Data Store includes departure (current) time, the battery state (SoC) and SoC Thresholds/Limits, vehicle empty weight, the current location and route. For the planned route, the planned stops (locations) for passengers and chargers are established. For each charger on the route, the rate schedule and the spot rates for electricity are known. The theoretical SoC used for each route segment is predicted using modeling based on past histogram data for the route, a similar route, or a simplified exemplary route model. The calendar and scheduled events along the route (and detours) are known and are considered during route pre-planning and modeling.

The Enroute State 802 is expected to be the most common state and encompasses all travel. During the Enroute State 802, the data store accumulates the current time, current position, SoC, passenger count, traffic conditions and vehicle speed.

The data store may use a periodic or event driven update to accumulate and store vehicle and route data. Stored data is tagged with the time as well as the current location and route segment. The odometer mileage may be used as a fallback positioning for when precise location is not available. Data may be uploaded via wireless connection (e.g., cellular or satellite modems) to the dispatch office.

For Passenger Pickup with charging 803, the data store is updated with the start time and end time of the stop. Using the passenger on/off counter (or the bus weight change as a proxy), the total number of passengers served, the current number of passengers, and the embarking and disembarking passenger counts are updated. With charging taking place, the charging current, start and end SoC is recorded. The charger may send additional charging session data via its communication link that includes charger status (and vehicle wireless power receiver status) as well as details concerning the inductive charging energy transfer (e.g., coupling, frequency, equipment temperature(s)).

Route information may be updated via the charging site communications system or the bus's radio communications system. Route related information includes distance to next stop, type of stop, SoC thresholds and limits, charger status and availability at next stop with a charger, and charger status for at least all chargers along the route.

For a Driver Break with charging 804, the data store is updated with the start time and end time of the stop. Using the passenger on/off counter (or the bus weight change as a proxy), the total number of passengers served, the current number of passengers, and the embarking and disembarking passenger counts are updated. With charging taking place, the charging current, start and end SoC is recorded. The charger may send additional charging session data via its communication link that includes charger status (and vehicle wireless power receiver status) as well as details concerning the inductive charging energy transfer (e.g., coupling, frequency, equipment temperature(s)).

Route information may be updated via the charging site communications system or the bus's radio communications system. Route related information includes distance to next stop, type of stop, predicted SoC, etc.

For a Charger Stop 805, the data store is updated with the start time and end time of the stop. No passengers are expected to board or disembark at a charger stop 805. With charging taking place, the charging current, start and end SoC is recorded. The charger may send additional charging session data via its communication link that includes charger status (and vehicle wireless power receiver status) as well as details concerning the inductive charging energy transfer (e.g., coupling, frequency, equipment temperature(s)).

During the Charging Stop 805, route information may be updated via the charging site communications system or the bus's radio communications system. Route related information includes distance to next stop, type of stop, predicted SoC, etc.

For a Driver Break 806, the data store is updated with the start time and end time of the stop. Using the passenger on/off counter (or the bus weight change as a proxy), the total number of passengers served, the current number of passengers, and the embarking and disembarking passenger counts are updated. With no charging taking place at a Driver Break 806, the start and end SoC is recorded. Route information may also be updated via the bus's radio communications system. Route related information includes distance to next stop, type of stop, predicted SoC, etc.

For a Passenger Pickup (without Charging) 807, the data store is updated with the start time and end time of the stop. Using the passenger on/off counter (or the bus weight change as a proxy), the total number of passengers served, the current number of passengers, and the embarking and disembarking passenger counts are updated. With no charging taking place, the start and end SoC is recorded.

At a Passenger Pickup (without Charging) 807, route information may be updated via the bus's radio communications system. Route related information includes distance to next stop, type of stop, SoC thresholds and limits, predicted end SoC, charger status and availability at next stop with a charger, and charger status for at least all chargers along the route.

FIG. 9

Figure 9:
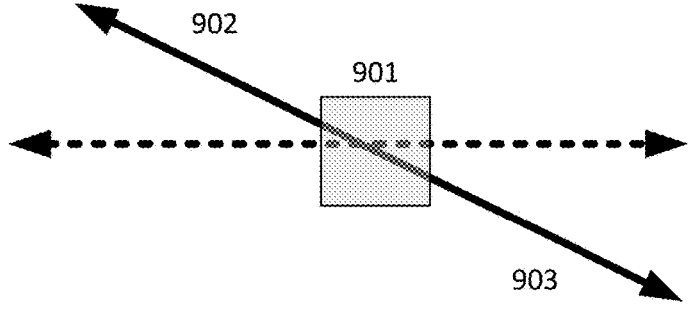
FIG. 9 is a diagram diagrammatically illustrating the case where a single charger is used to service first and second transit routes and thus service multiple EVs that service those routes.

FIG. 9 is a diagram diagrammatically illustrating the case where a single charger 901 is used to service first 902 and second 903 transit routes and thus service multiple EVs that service those routes 902 and 903.

In some cases, the power available for opportunity charging at a charger may be exceeded by the amount of power requested or the number of vehicles that need charging, or both. This includes allocation of chargers that match particular vehicle populations or chargers that support nonstandard communications protocols or charging signaling.

Contention for scarce charging resources (power and/or chargers) occur for cross-route charging stations, such as shown in FIG. 9. Contention may also occur for third party operated charging stations, stations experiencing back-up due to in-transit delays, stations with chargers disabled, chargers in localities with electrical shortages, and in cases of emergency service preemption of chargers.

The contended charger resources also experience fluctuating energy prices over space (geographical) and time of day. Power distribution planning, and energy management via prediction from modeling of historical data can be used to administer and allocate the limited available power for use at each station or particular charger at the station.

In cross-route stations, such as in FIG. 9, serving two or more transit routes, arrival of transit vehicles may differ from the scheduled arrival and charging times.

With third party operated charging stations, time of vehicle arrival, the number of vehicles, the charging levels, the total charge demand, as well as the number of modular charging pads per charger and per vehicle (as described in U.S. patent application Ser. No. 17/646,844; "METHOD AND APPARATUS FOR THE SELECTIVE GUIDANCE OF VEHICLES TO A WIRELESS CHARGER") may be considered even if a prioritization scheme and reservation system (as described in U.S. patent application Ser. No. 17/199,234; "OPPORTUNITY CHARGING OF QUEUED ELECTRIC VEHICLES") are fielded.

At charging stations experiencing back-up due to in-transit delays, a queuing scheme based on scheduled departure time and vehicle SoC can be implemented. Planning for stations with non-functional chargers have the additional layer of complexity in that a modular charger may soft-fail where a subset of the charger is still available for use.

In some cases, electrical power shortages may require power rationing. Vehicles may be assigned power priority based on SoC or a ranking system. Power priority may be serviced by supplying a higher charging rate than lower priority vehicles or suspending power to lower priority vehicles.

Where emergency or other high priority electric vehicles need charging, a preemption scheme may be provided where a currently charging vehicle has its charger commandeered, or the next available charger is held for the use of the preempting vehicle.

FIG. 10

Figure 10:
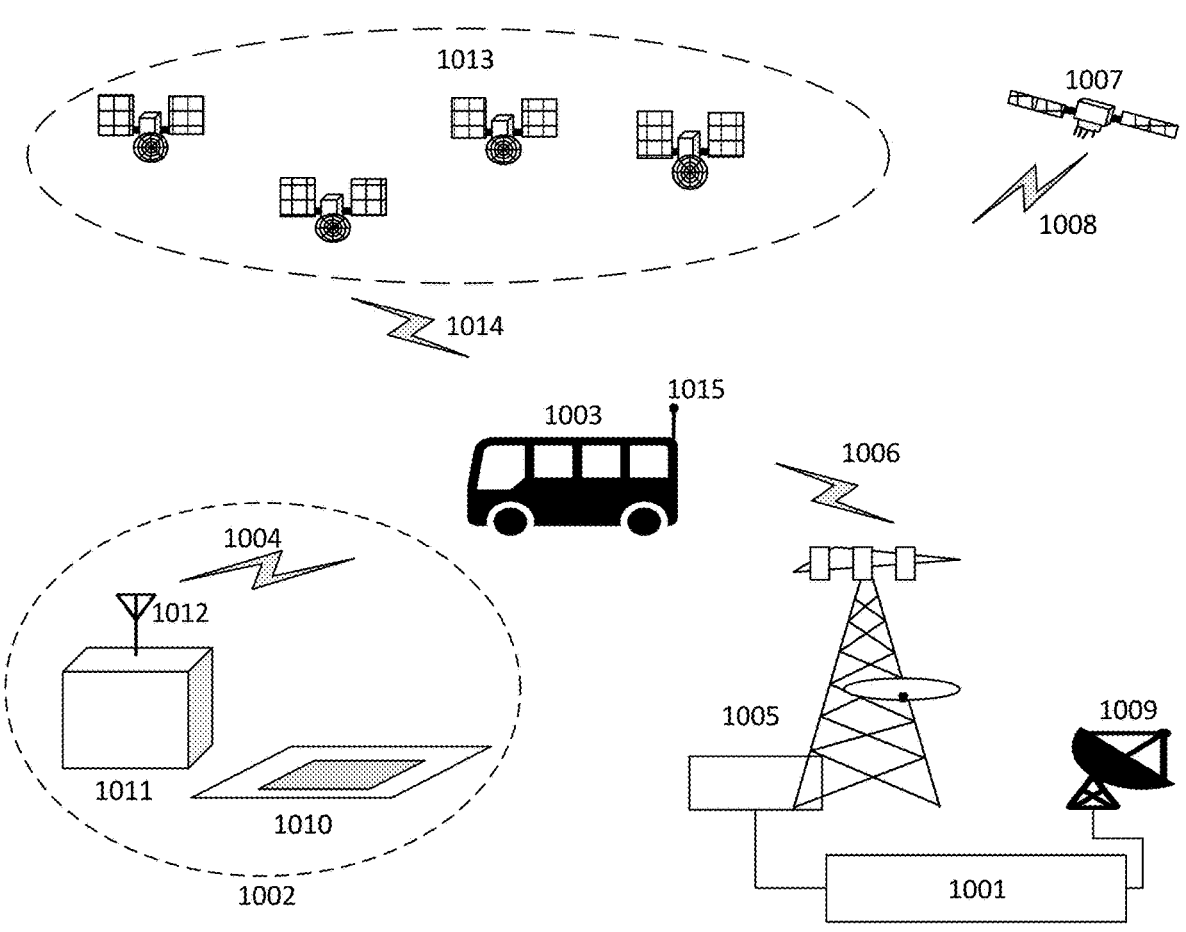
FIG. 10 is a diagram depicting at a high level the communication paths available for data collection from an EV and from the WPT charger.

FIG. 10 is a diagram depicting at a high level the communication paths available for data collection from an EV and from the WPT charger. Data collection is used for strategic opportunity charging pricing. Telemetry (including bi-directional telemetry) uses wired and wireless communications to transfer data and information between remote sources (including mobile sources and users) and distant destinations. Telemetry data streams between source and destination can consist of continuous, periodic, polled, or ad hoc transmissions of data. Telemetry includes the automatic measurement and wireless transmission of data from remote sources with the data collected routed to receiving equipment at a destination site (e.g., the dispatch server 1001) for monitoring, display, recording/storage, post processing, analyzation and trending.

The data store is part of database software with data management software (e.g., the IBM Maximo Enterprise Management System) running on processor hardware with a computer operating system with a large memory storage unit. The functions of security and multi-party access control are via the data management software. In some implementations, the dispatch server 1001 and associated data stores may be implemented as a virtual, hosted (e.g., cloud-based) system or as an on-premise hardware (with requisite processors, memory, and fault tolerant data storage) and software system, based on generic high-availability computing platforms sized to fit processing and storage needs, local to the dispatch office. The dispatch server may include (or has interfaces to) redundant, and potentially partitioned and federated, databases; and Geographical Information Systems (GIS). Interfaces to other third party information such as electricity pricing, traffic and weather information may be centralized at the dispatch server 1001.

A data store resides in the vehicle but uploads accumulated data to the dispatch server 1001. Uploads may be on request of the dispatch office, or a periodic or event driven (e.g., a WPT charging sessions starts) update. The EV is equipped with a navigation system (e.g., based on Navstar GPS, Galileo, GLONASS, BeiDou, Quasi-Zenith Satellite System (QZSS) (also known as Michibiki) or a local radio location beacons). The data store has access to the vehicle systems and battery management system (BMS) via local data links (e.g., a Controller Area Network (CAN) bus).

Data sources can include databases of historical data, models using recorded and near-real time data. Sources can also include near-real time data that may include sensor output from sensors including either electrical data (such as voltage, current, or state-of-charge) or physical data (such as temperature(s), pressure, mass).

Telemetry also can include data products such as location, passenger count, time stamps, data source identifiers, map updates, and route updates. In this application, the vehicle data store accumulates and may transmit collected electric vehicle related data on a near-continuous basis to the dispatch server 1001.

The dispatch server 1001 includes application specific software that includes a data management system, APIs for interfacing with both third-party information feeds (e.g., traffic, weather, public charger status) and communications interfaces for data originating from the charger site(s) 1002 and from EV(s) 1003. The charger site 1002 may use either wired (not shown) or a wireless radio interface 1004 for bi-directional communications. Depending on the installation, such wireless radio interfaces can use public or private cellular data networks 1005 using public or private band radio signals 1006. An alternative or supplemental wireless radio network may be supplied from satellites 1007 using established satellite communications band radio signals 1008. Satellite data receiver(s) 1009 may be used to deliver satellite communicated data to the dispatch server 1001.

Data may be both generated by and communicated via the wireless charger site 1002 to the EV 1003 and/or the dispatch server 1001. Each charger site 1002 has at least a wireless charger 1010 and ancillary equipment 1011 (shown here as an above grade cabinet but may be installed in an underground vault). The ancillary equipment 1011 may contain a wired or wireless backhaul (shown here as a radio antenna 1012 for a cellular radio connection 1004).

Route segments for a transit bus 1003 are pre-planned with set arrival and departure time for each geographically pre-determined site. The time and the route segment and odometer reading allows calculation of a rough level of location. More precise location for a vehicle 1003 is available using vehicle mounted navigation receiver(s) (not shown) for Global Navigation Satellite Systems 1013 (e.g., Navstar GPS, Galileo, GLONASS, BeiDou, Quasi-Zenith Satellite System (QZSS) (also known as Michibiki)) using satellite broadcast signals 1014. Other communications satellite constellations broadcasts (e.g., the carrier frequencies from the Starlink system (a high-speed, low-latency broadband internet carrier designed for remote and rural locations across the globe) can also be used for positioning.

Alternately, precise positioning can be obtained using geographically local radio location beacons (beacons have a known frequency, known bandwidth, known or broadcast transmitter location, and a transmitted identification (ID)) where deployed or available.

In the transit EV 1003, radio receivers and transceivers 1015 are used to receive the GNSS or local beacon positioning signals, to communicate via landside cellular networks, and potentially use Satellite communications systems for receiving and transmitting information.

The dispatch office and servers 1001, especially in a region with multiple fleets and shared or 3rd party wireless charging resources, can be owned or managed by a 3rd party, non-fleet, party (the host) offering charging as a service (CAAS). The Charging As A Service program removes the burden of ownership and maintenance from the charging EV fleets, with the host providing such things as turnkey wireless charging stations, the management software, communications infrastructure, 24/7 support, professional field maintenance for charger resources, as well as planning and modeling to deploy new chargers and revamp existing charger deployments when the need for a change in charger location or an increase (or reduction) of charger capacity is detected at any existing charger site.

FIG. 11

Figure 11:
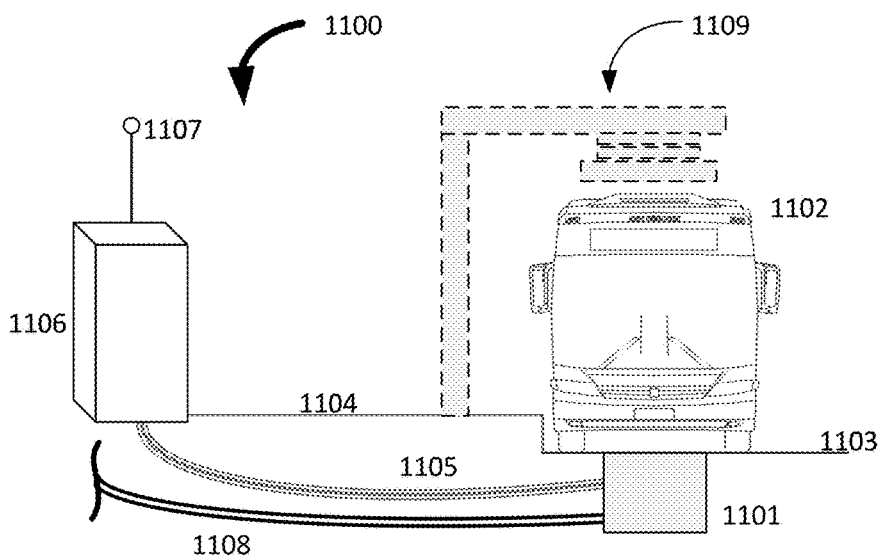
FIG. 11 is a diagram depicting an example wireless charger site.

An example wireless charger site 1100 is depicted in FIG. 11. A wireless charger 1101 for charging a transit vehicle 1102 is shown installed on level with the pavement 1103. A pedestrian area 1104 may be co-located if passengers embark or disembark at this portrayed site 1100. A conduit 1105 provides interconnection with the wireless charger for cooling lines from a cooling structure 1106 and for wired or optical communications lines (not shown) to the radio transceiver and antenna 1107.

The wireless charger 1101 provides radio communications between the wireless charger 1101 and the vehicle 1102. These communications may be as described in U.S. Pat. No. 10,135,496; "Near field, full duplex data link for use in static and dynamic resonant induction wireless charging"; issued Nov. 20, 2018. Static Inductive Charging relies on the EV maintaining its position during charging to pair the primary and secondary coils. Dynamic Inductive Charging uses near-continuous series of primary coils (often buried in the road), often consisting of coils elongated in the direction of travel, to charge the secondary coil attached to a moving vehicle. Semi-dynamic charging uses the same primary and secondary coils as the Static Inductive Charging system, but expands the operational angles at which a secondary coil may be serviced and thus total charging time for each primary coil.

The wireless charger 1101 in this example configuration is powered via a wired DC connection 1108 to the local utility grid (not shown).

In some cases, a mechanical actuator system for connecting a physical wire can be used for opportunity charging. The pantograph system 1109 shown is one such alternative system using a physical connector.

FIG. 12

FIG. 12 is a flow chart of a sample method 1200 for strategic opportunity charging in an example configuration.

As illustrated, the method 1200 includes creation at 1210 of a model based on historical data, similar routes, near-real-time sensor data, and third-party data for use in creating optimal routes for EVs used in commercial and non-commercial settings. The collected data relates to the environment, EV characteristics, power usage, charger characteristics, charging sessions, energy cost data, traffic, and route data for a single EV or a fleet of EVs.

Once the data model has been created at 1210, the collected data is processed with the data model to provide an initial estimate of the total cost per distance (TCD) of travel over anticipated route segments at 1220.

The route and the charging along the route segments is optimized at 1230 to reduce the TCD over the route for the EV or the fleet of EVs.

The EV then starts along a route segment. The telemetry systems and third-party systems collect data relating to the environment, the EV, power usage, cost of power, time of travel, etc. in near-real-time as the EV travels along the route segment at 1240.

At the end of the current route segment, the TCD is calculated at 1250. The TCD is calculated using the data model based on the collected environment, EV, power usage, cost of power, time of travel, traffic, etc. data that has been collected as the EV traversed the route segment.

An updated estimate for the next route segment is calculated at 1260 based on variations in the environment, EV, power usage, cost of power, time of travel, traffic, etc. The updated estimate further includes when/where the EV should charge along the next route segment for optimal TCD using available chargers and the available duration of the stop.

The steps 1240-1260 are repeated for each route segment until the process is reset.

FIG. 13

Figure 13:
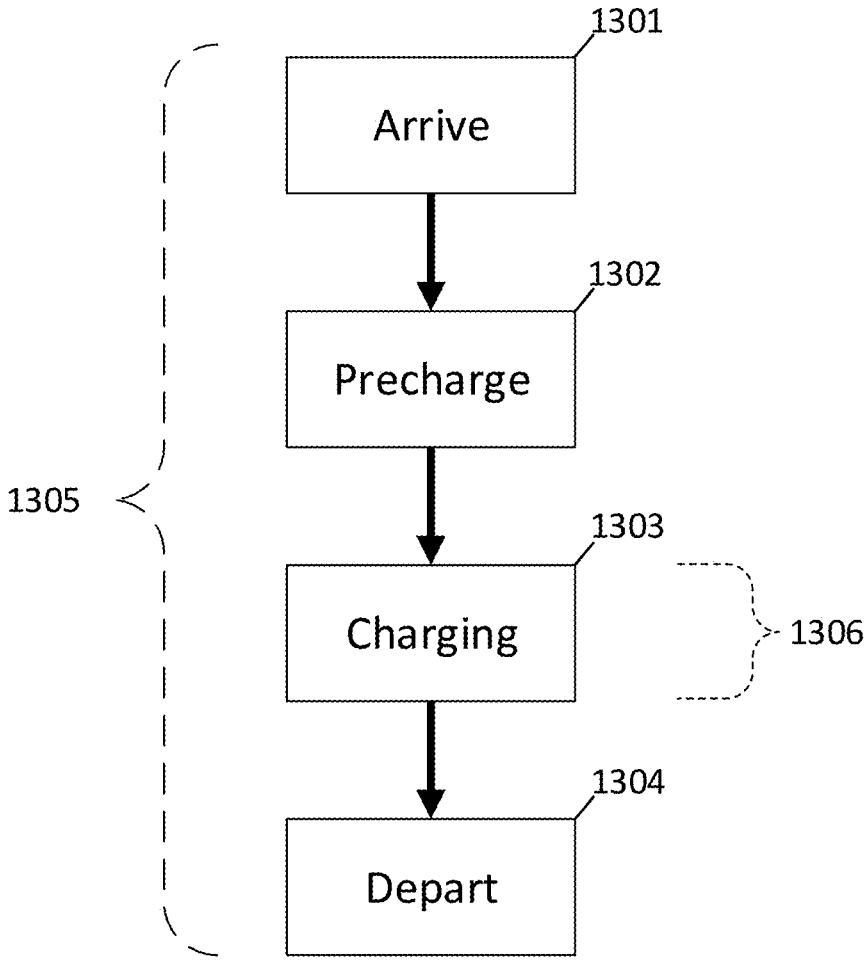
FIG. 13 is a flow chart depicting a complete wireless charging session.

FIG. 13 is a flow chart depicting at a high level the wireless charging operation at a time limited stop at a wireless charger. The EV first arrives 1301 with a first State of Charge (SoC) and is directed to a wireless charger. This direction can arrive via radio link but also via indicator lights, signage, or automated steering assistance (for examples see U.S. Pat. No. 10,040,360; "METHOD AND APPARATUS FOR THE ALIGNMENT OF VEHICLES PRIOR TO WIRELESS CHARGING INCLUDING A TRANSMISSION LINE THAT LEAKS A SIGNAL FOR ALIGNMENT" and U.S. patent application Ser. No. 17/646,844; "METHOD AND APPARATUS FOR THE SELECTIVE GUIDANCE OF VEHICLES TO A WIRELESS CHARGER").

During Pre-charge 1302, the ground charger and the vehicle power receiver are tuned for efficient wireless transfer at the achieved alignment and air gap. Information is exchanged for authorization and billing via a radio connection. In the case of a modular ground charger, multiple frequencies and phases (see, for example, U.S. patent application Ser. No. 17/207,257; "MODULAR MAGNETIC FLUX CONTROL") may be set.

During Charging 1303, the vehicle Battery Management System and the ground charger controller (not shown) negotiate the supplied current. The ground controller may set an initial maximum current supplied in accordance with the dispatch controller instructions (based on the data model) and then during charging alter the supplied current in accordance with new instructions.

Leaving the Charging Session, the EV departs the charging station at 1304 with a new SoC.

In the transit bus example, the EV has set arrival and departure times and thus a preset total stop duration 1305. The Charging interval 1306 is a subset of the total stop duration 1305.

FIG. 14

Figure 14:
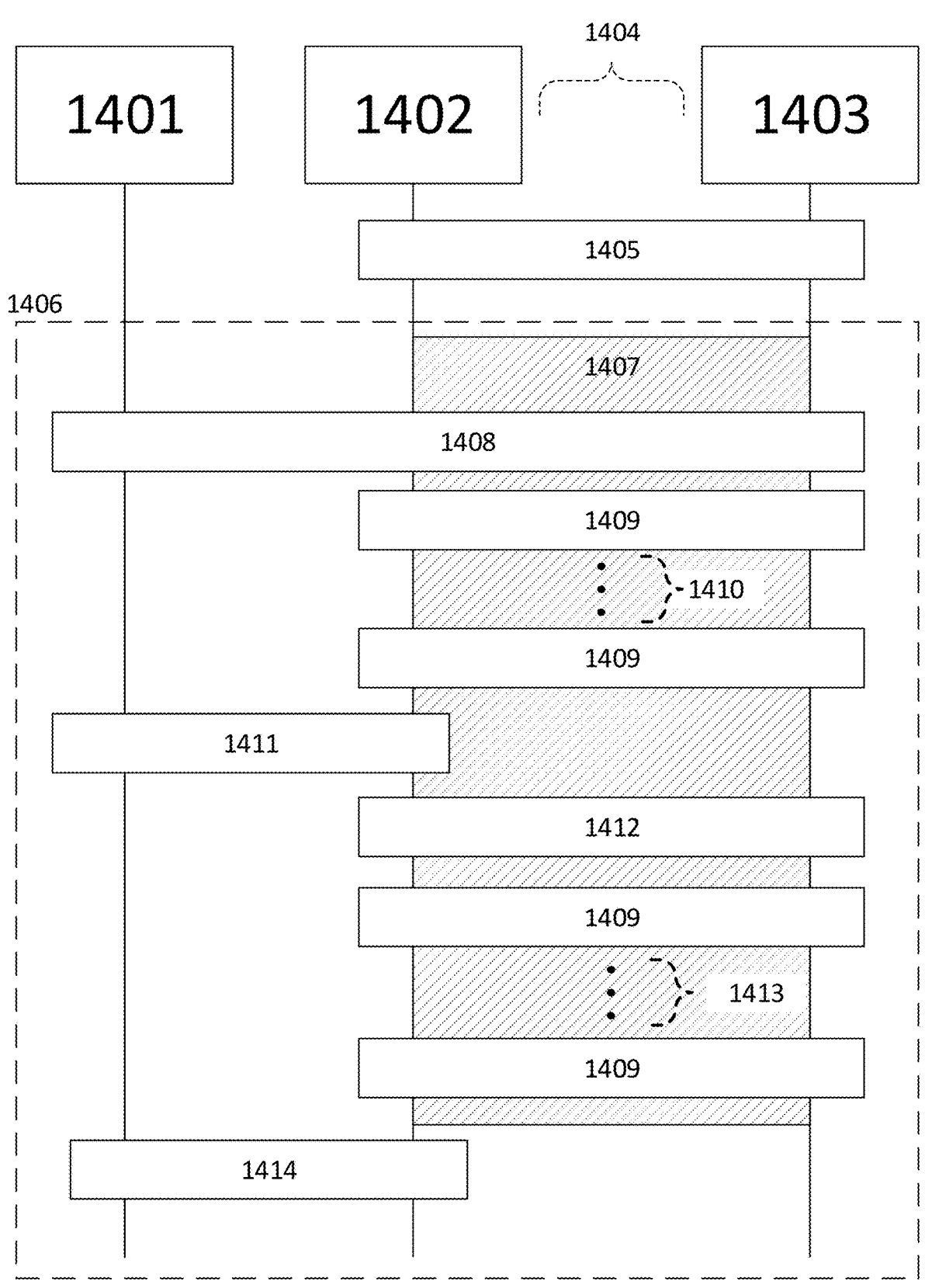
FIG. 14 is a timing diagram depicting charger to vehicle interactions.

FIG. 14 is a timing diagram depicting charger to vehicle interactions. In FIG. 14, the charging manager 1401 could be an application running on the dispatch server 1001, or a local controller (such as the charging station server (first disclosed in U.S. patent application Ser. No. 17/199,234; "OPPORTUNITY CHARGING OF QUEUED ELECTRIC VEHICLES", Filed Mar. 11, 2021 and included herein via reference) The Charging station server contains the charging manager 1401 software to manage the electrical supplies (from the utility and local storage), the charging station's internal communication links (both bridging and routing) with the wireless charger(s) 1402, and interconnection to entities (servers, data repositories, cloud instantiations) external to the charging station. All messaging in this example is paired, with each origination having a confirmation response.

In the current example, the Ground Charger Assembly (GCA) 1402 includes a near field radio communications interface (as detailed in U.S. Pat. No. 11,121,740; "NEAR FIELD, FULL DUPLEX DATA LINK FOR RESONANT INDUCTION WIRELESS CHARGING" and included herein via reference). The physically corresponding Vehicle Receiver Assembly (VRA) 1403 must be present across the air gap 1404 for charging when using the near field radio communications interface. Alternative or supplemental wireless communications links based on wireless local area networks (W-LAN) technology (e.g., IEEE 802.11, Zigbee, Bluetooth) may also be used.

Before the Wireless Charging Session 1406 begins with the GCA 1402 and VRA 1403 exchanging messaging for authorization, mutual authentication (in this model neither the GCA 1402 nor the VRA 1403 is trusted), and billing. The battery management system (BMS) operations in the current example is included in the VRA 1403 functionality and pass-through messaging.

Standardized messaging for a wireless power transfer charging of Electric Vehicles (EVs) has been published by the International Engineering Consortium (IEC) as IEC 61980, parts 1, 2, and 3. More specifically, IEC 61980-3: 2022; "ELECTRIC VEHICLE WIRELESS POWER TRANSFER (WPT) SYSTEMS—Part 3: Specific requirements for magnetic field wireless power transfer systems", (published November 2022) can be useful for generalized illustration purposes as the supported use cases and messaging herein differs.

Immediately before charging, radio messaging 1405 may be exchanged to measure and assure alignment between the GCA 1402 and VRA 1403, to measure the magnetic gap, to determine the efficient magnetic transmission frequency (see U.S. patent application Ser. No. 17/643,764; "Charging Frequency Determination for Wireless Power Transfer" and included herein via reference), and to exchange capability and limits.

Once the preliminary messaging 1405 is over and the charging session 1406 begins, the VRA 1403 and GCA 1402 begin exchanging information messages 1407 that contains relevant GCA 1402 and VRA 1403 electrical, temperature, and/or radio sensor data and provides a periodic heartbeat. The information messaging 1407 can contain BMS supplied information on the battery pack voltage(s), temperature(s), and State of Charge. The information message streaming 1407 continues throughout the duration of the wireless power transfer (while the magnetic flux is being generated).

The VRA 1403 then begins the power request/response messaging 1408 via radio signaling over the air interface 1404, via the GCA 1402 and to the charging manager 1401. The power request may include a requested current level and the power response may include a granted current value. The power request may also include a preferred current level and a maximum current level, and the power response may include a granted current value at or below the requested value or maximum current level.

The GCA 1402 will message the VRA 1403 confirming the initial current level assignment 1409 and energize the charging signal. During the duration of the power transfer 1410, the heartbeat/telemetry 1407 messaging continues.

In this example, the charging manager 1401 sends the GCA 1402 involved in the charging session 1406 a Rating command 1411. The Rating Command 1411 includes a current level that may be above or below the initial current level (the current level can be zero, pausing or ending the charging session 1406 prematurely). The updated current level is passed to the VRA 1403 before the charging signal is changed. The VRA 1403 acknowledges the updated current level in its response 1409 which can request the new maximum allowed current level or any current level below the updated current level.

For the second wireless power transfer duration 1413, the GCA 1402 provides magnetic signal to generate the new allowed current level in the VRA 1403. The EV, via the BMS and VRA 1403 will end the wireless power transfer by setting a requested current level to zero. The GCA 1402 will suspend the charging signal and inform the charging server 1401 via a termination notification 1414 that the session has ended. The GCA 1402 uses the termination notification 1414 to pass collected time(s), sensor, and performance data to the charging server 1401 for storage and analysis.

Demand Charge

FIG. 15

Figure 15:
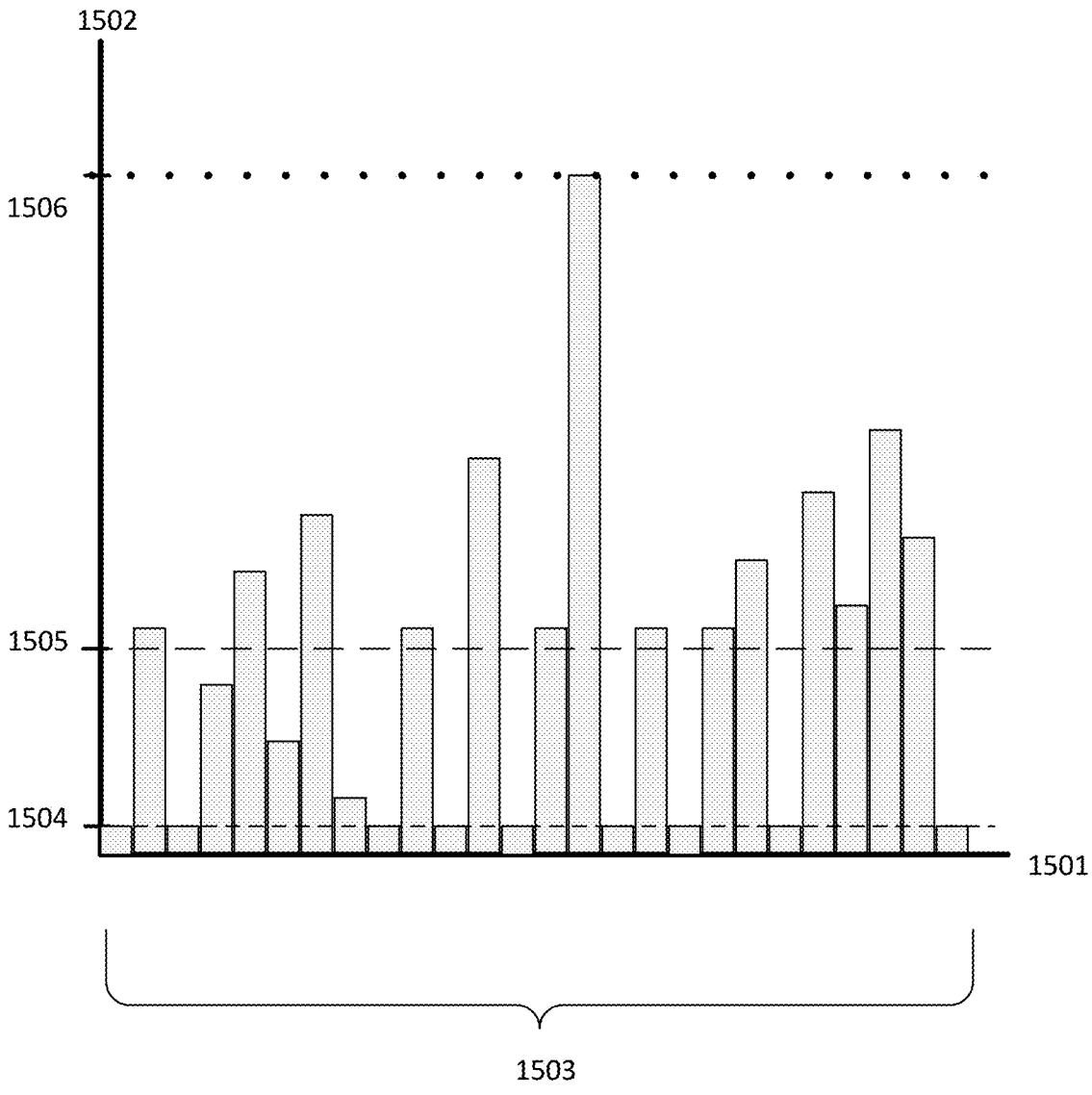
FIG. 15 is a chart showing an example rating period for a wireless charging customer with volumetric and demand charge components.

FIG. 15 is a chart showing the utility billing rates for a business customer. This example could be for a single charging station or an aggregate or charging stations.

The x-axis 1501 shows the time while the y-axis 1502 shows the consumed power (in kW). The power consumption varies over the billing period from the baseline 1504 to the peak demand 1506. The average power consumption 1505 can be determined over the billing period 1503.

Wireless Power Transfer electricity charges from the utility are expected to consist of both volumetric and demand components.

The volumetric component consists of fixed and variable charges: a transmission and distribution charge (T&D) for infrastructure; and a supply charge based on consumption during a billing interval. Note that the supply charge may be variable on time-of-day and seasonally (known as Time-of-Use (TOU)). The volumetric component is typically measured in kilowatt hours (kWh).

The demand component is based on the maximum amount of power required over a time period (e.g., single hour or set fraction of an hour) in a billing interval. The demand component is typically measured in kilowatts (kW).

Use of charger scheduling, which is coordinated the scheduling for charging of individual fleet vehicles to limit concurrent charging as well as efficient geospatial distribution of chargers can be used to reduce the demand charge component by an EV fleet.

Strategic placement of charger stations can be used to minimize infrastructure costs including T&D by limiting the number of chargers to less than one per every stop (on average). With this charger placement, multiple chargers may be installed at a stop served by more than one EV.

Preferential charging, Controlling SoC using wireless opportunity charging, during stops can, during the EV day, can be used to minimize electrical costs by charging only to reach the next charger (with reserve) during times of highest cost. Preferential charging can also include charging more (increasing the EV SoC) at stations with better electrical rates.

FIG. 16

Figures 16, 17:
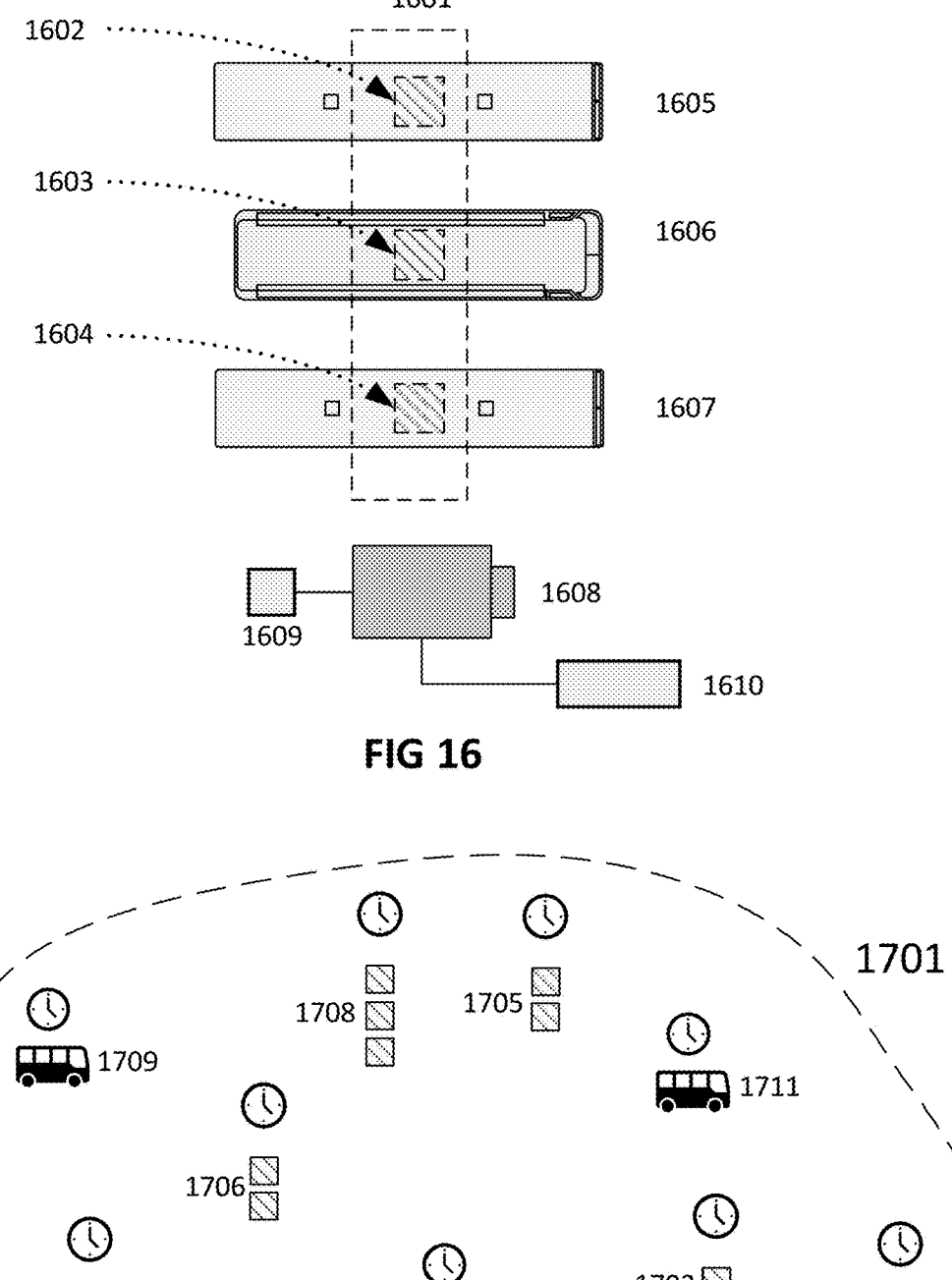
FIG. 16 is a diagram depicting an overhead view of a charging station in multiple chargers capable of serving multiple vehicles concurrently.
FIG. 17 is a diagram showing geographically the ability to use strategic opportunity charging to manage the utility demand charges.

FIG. 16 is a diagram showing an overhead view of a charging station at a stop, in this example a transit bus stop. The wireless power charging station 1601 in this example has three chargers 1602 1603 1604 arranged to serve up to three electric vehicles concurrently. In this example, each charger 1602 1603 1604 is serving a transit bus 1605 1606 1607.

All three chargers are served via underground electrical connections (not shown) to power electronics 1608. The power electronics 1608 are connected to the utility grid via drop 1609. The utility may supply AC, DC, or AC three phase power via the drop 1609.

The Power electronics 1608 may include local power storage 1610 (e.g., a storage battery) which can be used to prevent excursions over the concurrent demand threshold.

The local energy storage unit 1610 (see United States Patent Application Publication No. US20220368161A1, "Contactless swappable battery system" filed 2020 Oct. 30 for a working example of one such battery system) to allow "peak shaving" where energy is stored (trickle charged) during low electrical cost times and used during times of peak electrical cost. The battery storage may be physically swappable (for occasional or emergency use) or charged from the utility drop 1609 preferably during periods of low electricity cost. Alternative power sources such as wind or solar farms may be used to charge the local energy storage unit 1610.

To lower the demand and thus not exceed the desired maximum demand threshold the charging site controller may:

a. Allow each EV an equal share of available power.
    b. Prioritize power to the EV with the greatest need (SoC needed to reach next charger)
    c. Prioritize on arrival time and departure times so that power delivery changes as each vehicle arrives and departs
    d. Prioritize power optimize energy based on time-of-day billing rates Demand charges may be site specific (the size of the wire to a transformer and then meter), versus regional. Other avenues provide regional level controls (e.g., openADR—automated demand response).

Demand charges may be aggregated over a service area served by the utility for a single customer.

Additionally, the power available might be set by local or national governmental actions rather than a desired concurrent demand threshold to minimize utility demand charges.

FIG. 17

FIG. 17 is a diagram showing geographically the ability to use strategic opportunity charging to lower (or at least manage) the utility demand charge portion of the power cost. In the region 1701, chargers are distributed to serve a fleet of EVs on routes (routes may be fixed (pre-planned) or ad hoc (revisable)).

The region includes single-charger stations 1702 1703 1704, two charger stations 1705 1706 and three charger stations 1707 1708. These stations 1702 1703 1704 1705 1706 1707 1708 and the number of chargers per station are sited based on projected need for charging of the fleet. Geographically, the stations 1702 1703 1704 1705 1706 1707 1708 will be of varying distances from each other as are the passenger or delivery stops (not shown).

By coordinating the schedule for charging sessions of each fleet vehicle 1709 1710 1711 1712, the total demand for power can be kept below a threshold that would incur greater utility charges. This geospatial approach to total concurrent demand minimization can be optimized for the fleet further with the addition of additional, well-sited, opportunity charging stations to minimize the changing needs of EVs at any particular charging site or station.

FIG. 18

Figures 18, 19, 20:
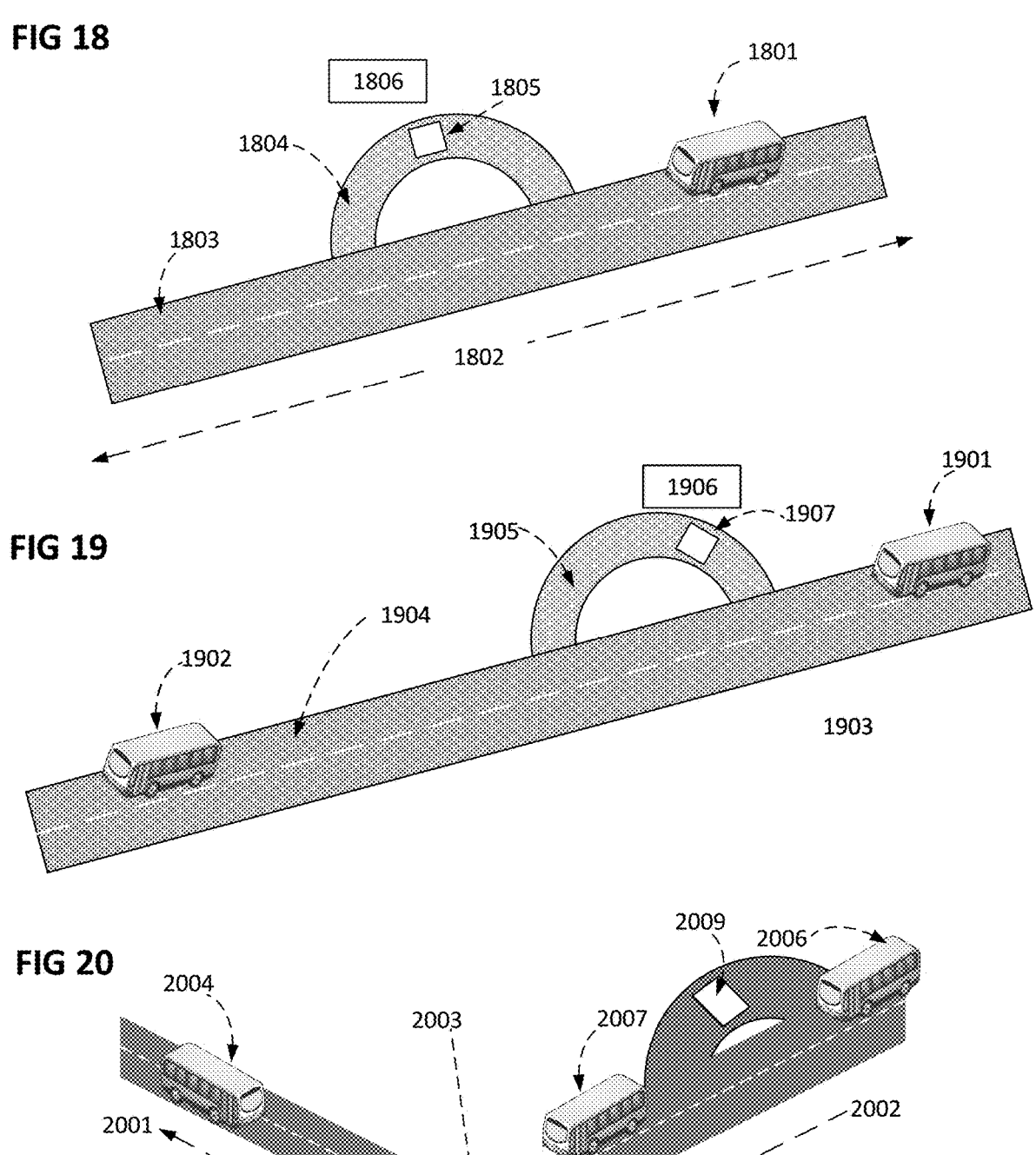
FIG. 18 is a diagram illustrating the example of single electric bus serving a single bus route.
FIG. 19 is a diagram illustrating the example of multiple electric buses serving a single bus route.
FIG. 20 is a diagram illustrating the example of multiple electric buses serving multiple bus routes with shared opportunity charger infrastructure.

In FIG. 18, the case of a single electric bus (at a time) serving a single route is shown. The EV bus 1801 is traveling the route 1802 mapped to the local road 1803. An access road 1804 equipped with a wireless opportunity charger 1805 allows the EV bus 1801 to charge for set power level and up to the duration of the scheduled bus stop.

Information about the bus's 1801 status, traveling conditions, loading, adherence to schedule, and power consumption may be collected and transmitted in near-real time along the route 1802 or at the stop 1806.

FIG. 19

In FIG. 19, the case of a multiple electric buses concurrently serving a single route is shown. This arrangement is made to decrease passenger wait times and/or to provide sufficient capacity to serve the route.

The first EV bus 1901 and the second EV bus 1902 are traveling the route 1903 mapped to the local road 1904. An access road 1905 for the bus stop 1906 is equipped with a wireless opportunity charger 1907 allows the first and second EV buses 1901 1902 to charge for set power level and up to the duration of the scheduled bus stop while passengers board or disembark.

Information about the buses 1901 1902 statues, traveling conditions, loading, adherence to schedule, and power consumption may be collected and transmitted in near-real time along the route 1903 or at the stop 1906.

FIG. 20

In FIG. 20, the case of a multiple electric buses concurrently serving multiple routes is shown. The buses may be from the same fleet or from different ones. In this example, the wireless charging infrastructure is shared.

A first route 2001 and a second route 2002 share the same local road network 2003. The first route 2001 is served by a first 2004 and second 2005 EV bus which move along the route 2001 in adherence to a first schedule. The second route 2002 is served by a first 2006 and second 2007 EV bus which move along the second route 2002 in adherence to a second schedule.

Placed along the first 2001 and second route 2002 is a wireless opportunity charger 2008. The first and second schedules must be aligned to permit each EV bus 2004 2005 2006 2007 sufficient charging time. The power consumption and this power supplied via the wireless opportunity charger 2008 (and other shared or unshared chargers such as wireless opportunity charger 2009) must also be coordinated (by the dispatch server 1001) to avoid exorbitant tine-of-use electrical rates and utility demand charges as well as to not over-stress the wireless charger's ability to cool during and between charging sessions.

Information about the buses 2004 2005 2006 2007 status's, traveling conditions, loading, adherence to schedule, and power consumption may be collected and transmitted in near-real time along the routes 2001 2002 or at the stop wireless charger(s) 2008 2009. Information about the wireless chargers 2008 2009 themselves may also be transmitted in near-real time or collected and transmitted periodically or triggered by an event (e.g., before, after, and during a charging session).

ADDITIONAL EMBODIMENTS

FIG. 21

Figure 21:
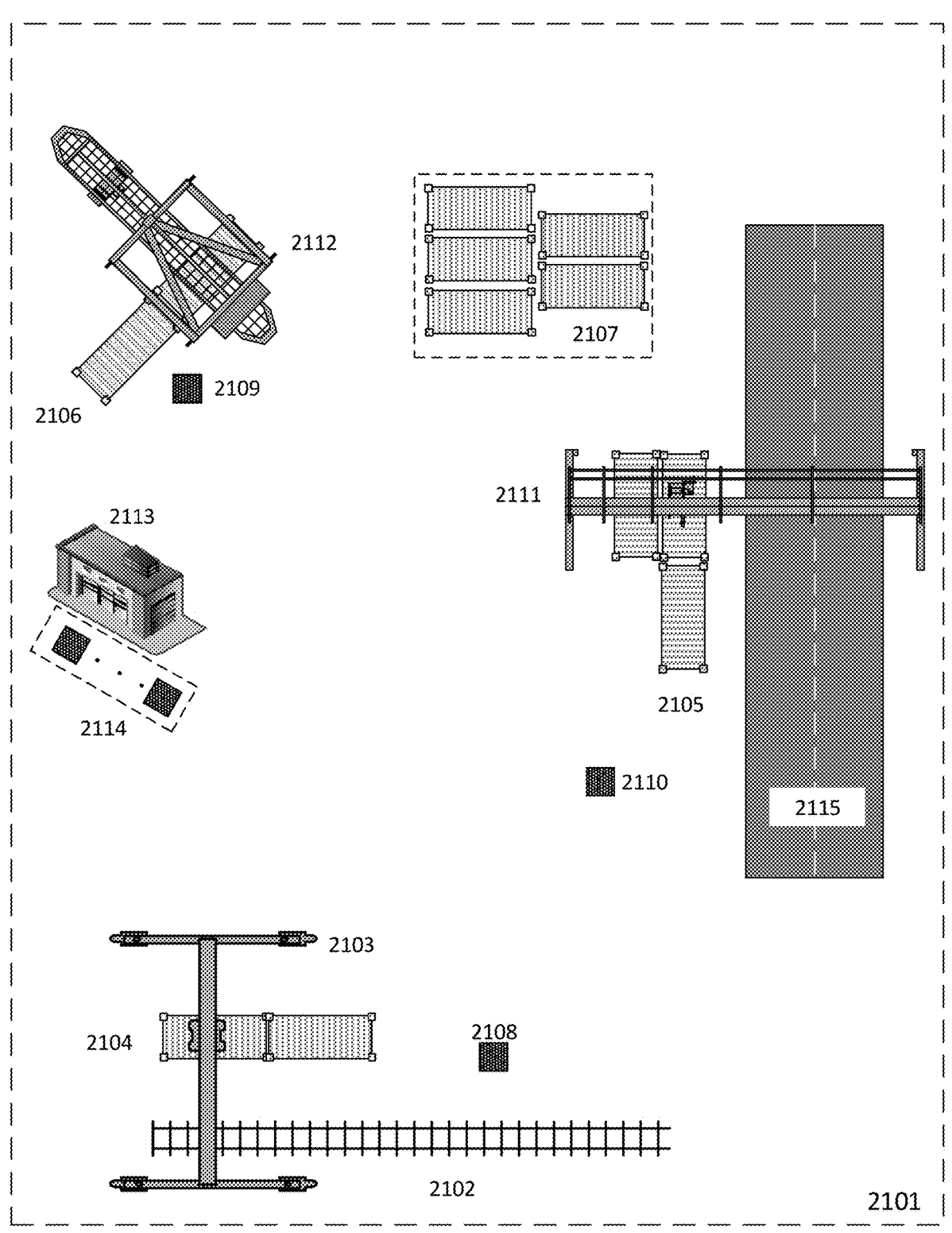
FIG. 21 is a diagram depicting an example drayage yard using electric cargo transfer vehicles (not shown) with strategic wireless opportunity charging.

FIG. 21 is a diagram depicting an example drayage yard 2101 using electric cargo transfer vehicles (not shown) with strategic wireless opportunity charging. In this example, both the load weight and the distance traveled are the major determiners of battery consumption of the electric transfer vehicles (e.g., forklifts, side loaders, reach trucks). In FIG. 21, the movement of containerized cargo is described as an illustrative example.

Containers may be loaded and unloaded from a cargo rail system 2102 by yard vehicles. Specialized container handling machines 2103 are used to transfer cargo containers from visiting rail cars to a local rail yard stack 2104. The local rail yard stack 2104 is attended by transfer vehicles equipped with WPT receivers which may move containers to or from the truck yard stack 2105, the dockyard stack 2106 or to the temporary storage stack 2107. Since each stack; 2104, 2105, 2106, and 2107 are frequently visited by transfer vehicles, wireless chargers may be placed at each based on usage levels and wait time for containers. In this example, a rail yard charger 2108, a dockyard charger 2109, and a truck yard charger 2110 are installed. In this example, the storage stack 2107 is not equipped with co-located charger (s).

The truck yard stack 2105 may be added to by unloading trucks using the crane apparatus 2111, added to by transferred containers or reduced by loading of containers onto trucks or by rerouted containers to other transport or storage 2107 using transfer vehicles.

The dockyard stack 2106 may be added to by unloading trucks using the cargo crane 2112, added to by transferred containers or reduced by loading of containers onto ships or barges (not shown) or by rerouted containers to other transport or storage 2107 using transfer vehicles.

The storage stack 2107 can be added to or reduced by transfer of containers to and from each transport yard stack 2104, 2105, and 2106.

The transfer management application (similar to the software and databases used in the dispatch center 1001) uses near real-time data on cargo container weights (either manifest weight or weight via sensors onboard the transfer vehicles), cargo container location, transfer vehicle location, transfer vehicle state of charge, container destination (and thus distance to travel) and current queuing at the source and destination stacks to manage opportunity charging schedules for each charger 2108, 2109, and 2110 as well as charge levels, and charging duration for each charging session to minimize downtime and cost of travel.

The drayage yard 2101 also contains a rest and repair depot 2113 with its own associated wireless chargers 2114.

A highway 2115 spur serves the drayage yard 2101, here serving both as access for cargo truck access and for employee personal vehicles.

FIG. 22

Figure 22:
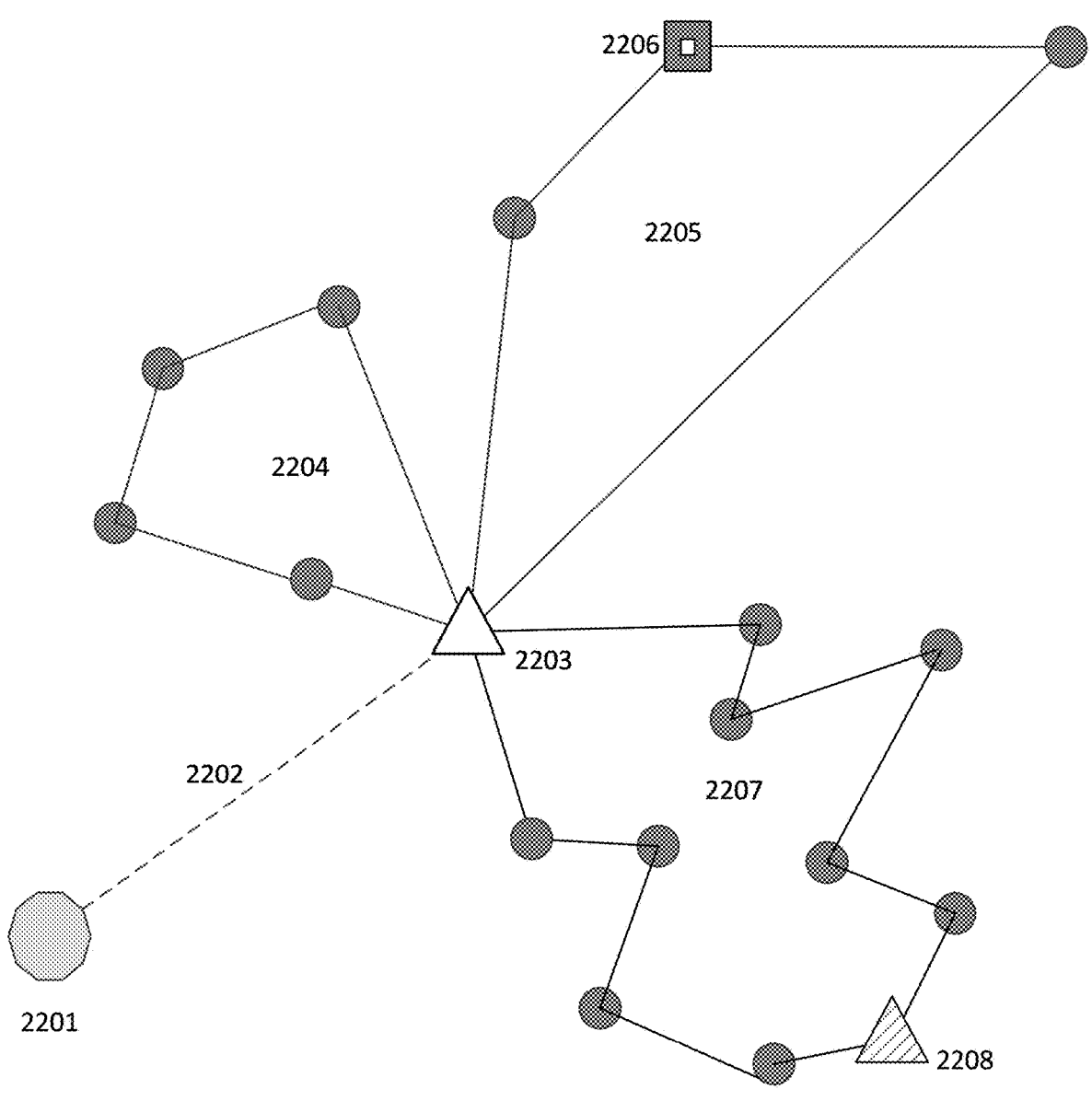
FIG. 22 is a diagram geographically depicting an electric delivery vehicle route using strategic opportunity charging to minimize cost of travel.

FIG. 22 is a diagram geographically depicting an electric delivery vehicle route using strategic opportunity to minimize cost of travel.

Delivery vehicles are stored and maintained at the depot 2201 which may be separated by a distance 2202 from the first distribution center 2203. A wireless opportunity charger may be installed at the first distribution center 2203. The delivery vehicle has a first route 2204 with multiple stops. Stops may be delivery only, pickup delivery, or both depending on the type of delivery service offered. The first route 2204 returns the vehicle to the first distribution center 2203 where package loading or unloading can occur during an opportunity charging session if needed.

A second delivery route 2205 includes a third-party public or subscribed wireless charger 2206 where charging can be accomplished if necessary or desired to keep the delivery vehicle's battery in the desired SoC range.

At the end of the second delivery route 2205, the vehicle returns to the first distribution center 2203 where package loading or unloading can occur during an opportunity charging session if needed.

A third delivery route 2207 includes a visit to a second distribution center 2208 among the regular stops. The second distribution center 2208 may include a wireless opportunity charger which can be used to recharge the delivery vehicle. The third delivery route 2207 concludes at the first distribution center 2203 where the vehicle is unloaded and recharged to a charge level optimal for overnight storage at the depot 2201, taking into the charge used to travel the distance 2202 to the depot 2201.

Ad-Hoc Delivery Service Implementation

Strategic Opportunity Charging for EV taxi, courier, and package conveyance services differs from that of known route, known stop, and pre-positioned charging stations in the above embodiments. For these EV vehicles, routes and stops for passengers, freight, and opportunity charging cannot be pre-planned for the service day.

Rather, a roughly geographically distributed fleet uses a mix of private and commercial opportunity chargers over a service area where modeled and accumulated historical data, traffic data, vehicle range efficiency, and location (of vehicle (s), pick-up(s), drop-off(s), and chargers) is used to estimate ad hoc routing. Radio data communications between a dispatch service, customers, and vehicles is necessary for the service. The ad hoc services examples applies to EVs with drivers, driver-assistance software, or fully autonomous EVs.\

Selection of EVs to service a pick-up (passenger(s) or package(s) can use location data, estimated travel times and estimated power consumption to select among candidate EVs dependent on service criteria (pick-up time, drop-off time, power efficiency).

Since dedicated charging stations are not expected, potential charging stations may include wired and wireless facilities where the selection of station is based on schedules, estimated off-route distance, estimate charging time, and EV compatibility with the chargers.

Figure 23:
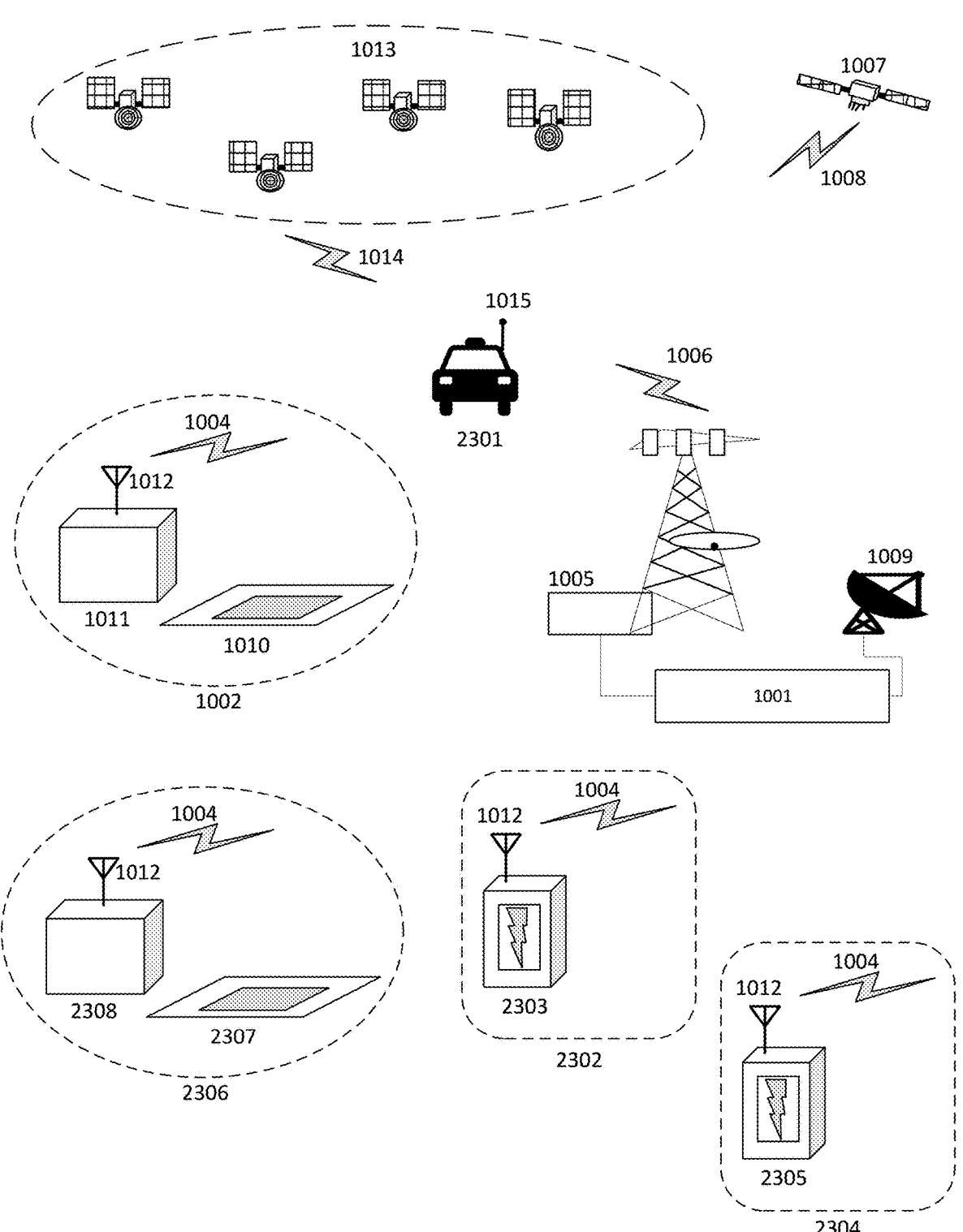
FIG. 23 is a diagram illustrating additional charging components for public and private charging stations in a typological fashion.

FIG. 23 is a diagram illustrating additional charging components for public and private charging stations in a typological fashion. FIG. 23 illustrates new charging and communications capabilities added to the diagram of FIG. 10. To support both wireless and wired EV charging (the wired EV charging can include conventional plug-in chargers as well as the wired pantograph system shown in FIG. 11), additional facilities may be used by hybrid Wireless/Wired EV(s) 2301 adapted to support bi-directional charging capabilities.

For example, a wired plug-in or pantograph equipped charging station 2302 with power electronics 2303 to support one or more charging levels using AC and/or DC charging as shown uses the wireless data connection 1004 via an antenna 1012 to communicate with the dispatch office 1001 through the wireless data network 1005. A bidirectional wired station 2304 also may be used by the EV 2301 for charging (or discharging). The power electronics 2305 in the bi-directional case would be able to draw from or feed the local battery facility or the electrical grid (not shown). A wireless bi-directional station 2306 equipped with bi-directional wireless chargers 2307 and bi-directional power electronics 2308 able to draw from or feed the local battery power storage facility or the electrical grid (not shown) also may be provided for use by the EV 2301 for charging (or discharging).

FIG. 24

Figure 24:
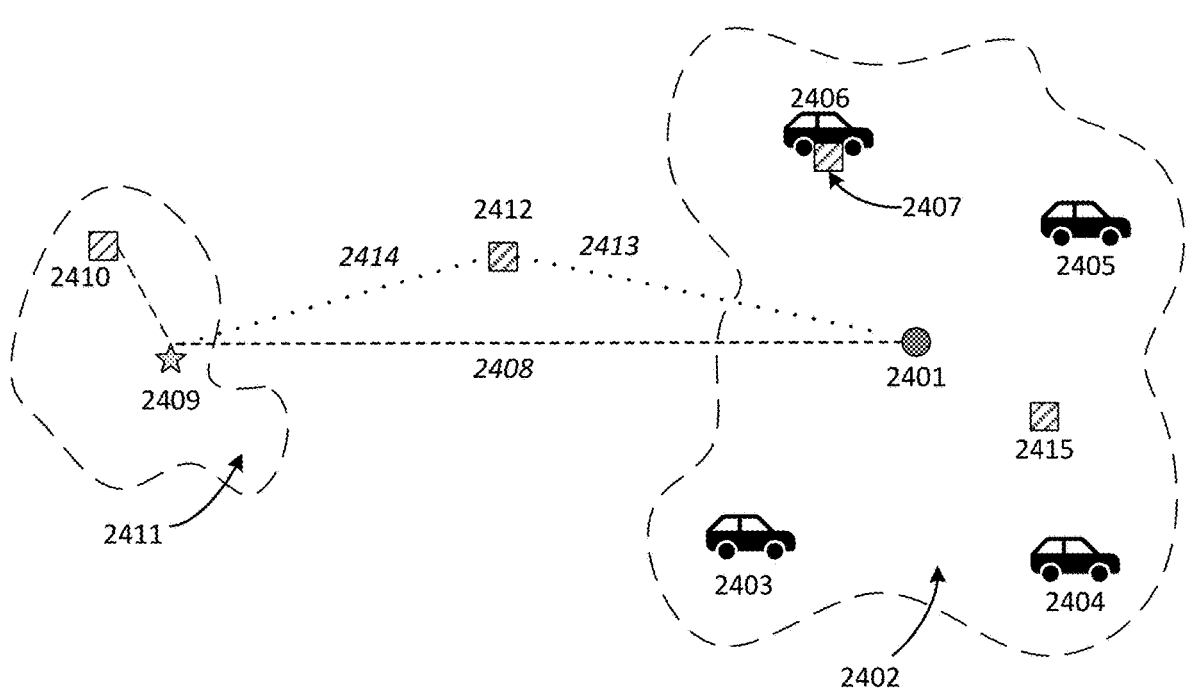
FIG. 24 is a diagram illustrating an example scenario for a dispatched pick-up and delivery service using EVs and opportunity charging in a sample configuration.

FIG. 24 is a diagram illustrating an example scenario for a dispatched pick-up and delivery service using EVs and opportunity charging in a sample configuration. FIG. 24 topographically depicts an ad hoc delivery service adding a pick-up location and time (or time and date). This scenario covers both package delivery services and taxi services using Electric Vehicles (EVs). In this example, an immediate pick-up is requested with a soonest drop-off. A soonest designation means most time-efficient routing. An economic designation means most charge efficient. A shortest route may be either a soonest route or a least distance route.

The dispatch office 1001 receives a request for pick-up at a pick-up location 2401 at a pick-up time. The dispatch office 1001 finds all dispatchable EVs within (or scheduled to be within) a geographic area 2402 in proximity to the pickup point 2401. Some EVs may be in-route or have a schedule conflict and are thus unavailable to the dispatch office 1001. Available EVs 2403, 2404, 2405, and 2406 are then queried by the dispatch office 1001 for status, which includes current state-of-charge (SoC). EVs 2403, 2404, and 2405 report their status (which includes a current SoC). EV 2406, charging at charger 2407, may also report its current SoC and its expected SoC at the scheduled end-of-charge.

Using the reported current SoCs, GIS capabilities, and traffic forecasting, the dispatch office calculates the charge needed to go to the pickup location 2401, use the shortest path 2408 to go to the drop-off point 2409, and then proceed to the charging station 2410 nearest the drop-off 2409 for each candidate EV 2403, 2404, 2405, and 2406. The selection of chargers after drop-off (if necessary) is determined by a power-consumption distance from the drop-off point 2409, resulting in a geographic charger search area 2411. Based on the soonest pickup and delivery options, the EV with sufficient charge to complete the journey that could pick up the package with a minimal delay after the dispatch office 1001 received the request would be selected for the delivery.

If no candidate EV 2403, 2404, 2405, or 2406 has sufficient charge to complete their individual route, then the route can be modified to accommodate an opportunity charging session at an available charger 2412 which would change each individual route(s). In this case, all candidate EVs would be directed to a near mid-point charger 2412 using a shortest route 2413 between the pick-up point 2401 and the charger 2412. The shortest route 2414 from the charger 2412 to the drop-off 2409 would also be plotted for each EV.

Alternatively, use of a charger 2415 located in proximity to the pick-up point 2401 could be scheduled for any candidate EV 2403, 2404, 2405, or 2406 for charging before or after pickup so that the mid-point charger 2412 could be reached with minimal delay to the pickup time or the destination 2409 could be reached without additional charging.

Based on the soonest pickup and delivery options, the EV that can complete the journey with minimal time (including a mid-journey charging event) spent would be selected to pick up the package with a minimal delay after the dispatch office 1001 received the request.

FIG. 25

Figure 25:
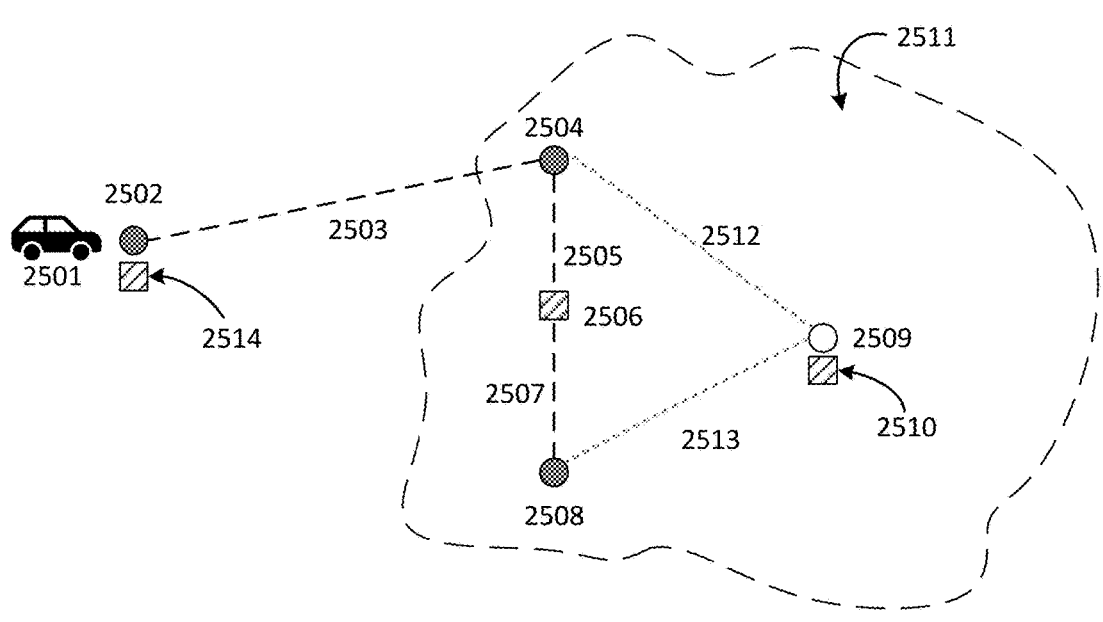
FIG. 25 is a diagram illustrating an example scenario for the rescheduling and re-routing of a pick-up and delivery EV using wireless and/or wired opportunity charging in a sample configuration.

FIG. 25 is a diagram illustrating an example scenario for the rescheduling and re-routing of a pick-up and delivery EV using wireless and/or wired opportunity charging in a sample configuration. In this scenario, the pickup and delivery EV 2501 leaves the depot 2502 with a planned journey of route segments 2503, 2505, and 2507, destinations 2504 and 2508, and charging station(s) 2506. At some time after leaving the depot 2502, a new package pickup location 2509 within a general service area 2511 is added to the journey requiring a recalculation of the routes, arrival times, departure times, and SoC needed to complete each route segment.

The dispatch office 1001 adds two route segments 2512 and 2513 to the journey to reach the new destination 2509. The added destination 2509 has a co-located charging station 2510. Based on the schedule, distances, and calculated state of charge, the dispatch office 1001 cancels the charging session scheduled at the previous charging station 2506 and the two associated route segments 2505 and 2507.

The new journey plan includes all previously scheduled destinations and the new destination within the goals of minimizing travel distance, minimizing schedule disruption (s), and maintaining a SoC between thresholds. The availability of a charger 2514 at the depot 2502 allows for departure of the EV 2501 at a maximum SoC operational capacity and a return to depot 2502 at the minimal SoC operational capacity.

FIG. 26

Figure 26:
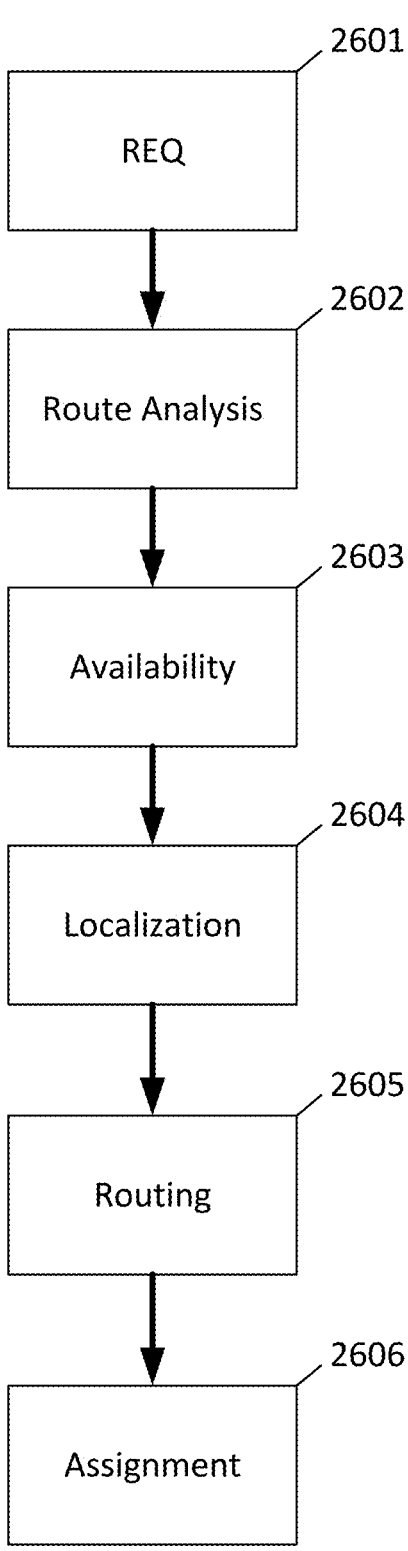
FIG. 26 is a flow chart illustrating an event sequence selection and assignment of an EV pick-up and delivery vehicle for handling a request for a person or package conveyance by an EV service vehicle using opportunity charging in a sample configuration.

FIG. 26 is a flow chart illustrating an event sequence selection and assignment of an EV pick-up and delivery vehicle for handling a request for a person or package conveyance by an EV service vehicle using opportunity charging in a sample configuration.

In FIG. 26, the dispatch office 1001 receives a task request 2601 for package or person(s) pick-up and drop-off. The request 2601 includes the pick-up and drop-off locations, time sensitivity around either or both the pick-up and drop-off events, and requestor preferences for package or person handling (e.g., type of vehicle, vehicle facilities (e.g., refrigeration, ramp, wheelchair lift, EV mileage and services cost(s), type of service (e.g., courier, limousine, taxi, public transportation, light/medium/heavy cargo truck)). Based on the request, a set of candidate EVs is determined.

Based on the request, a preliminary route analysis 2602 of the route(s) between the pick-up and drop-off locations is performed by the dispatch office 1001 based on the prefer-ences and timings from the request 2601. A point-to-point travel time and electrical power consumption (for the speci-fied vehicle class) estimate is calculated.

Availability 2603 of EVs during the time window of service (as determined by the time sensitivity in the task request 2601) is used to reduce the population of EVs considered for servicing the task. EVs that cannot be sched-uled for pick-up and delivery will be excluded from further consideration.

Localization 2604 is used to further winnow the EV candidates for the task. Both the estimated charge consumed and the estimated time necessary to reach the pick-up point are considered in Localization 2604.

For each remaining candidate EV, routing calculations 2605 are performed by the dispatch office 1001 to develop individual routes. Each route contains a pick-up time esti-mate and location, a drop-off time-estimate and location, and power consumption. To keep EV state-of-charge within the operation SoC thresholds, opportunity charging sessions may be included in the route planning, each with an arrival and departure estimate, a total power transfer (expressed as a SoC). Those EVs with routes that cannot meet a scheduled pick-up time or drop-off time are eliminated as candidates.

From the remaining candidate EVs, one EV will be assigned at 2606 to service the request. Both adherence to time sensitivity parameters and minimization of predicted power consumption will be factors in the final selection.

While examples have been provided for commercial vehicles such as buses, drayage vehicles, and delivery vehicles, it will be appreciated that the methods described herein may also be applied to non-commercial vehicles such as EVs driven by individuals with or without software-based driving assistance. These same methods can be used for autonomously driven vehicles

CONCLUSION

While various implementations have been described above, it should be understood that they have been presented by way of example only, and not limitation. For example, any of the elements associated with the systems and methods described above may employ any of the desired function-ality set forth hereinabove. Thus, the breadth and scope of a preferred implementation should not be limited by any of the above-described sample implementations.

As discussed herein, the logic, commands, or instructions that implement aspects of the methods described herein may be provided in a computing system including any number of form factors for the computing system such as desktop or notebook personal computers, mobile devices such as tab-lets, netbooks, and smartphones, client terminals and server-hosted machine instances, and the like. Another embodiment discussed herein includes the incorporation of the techniques discussed herein into other forms, including into other forms of programmed logic, hardware configurations, or special-ized components or modules, including an apparatus with respective means to perform the functions of such tech-niques. The respective algorithms used to implement the functions of such techniques may include a sequence of some or all of the electronic operations described herein, or other aspects depicted in the accompanying drawings and detailed description below. Such systems and computer-readable media including instructions for implementing the methods described herein also constitute sample embodi-ments.

The processing functions described herein may be imple-mented in software in one embodiment. The software may consist of computer executable instructions stored on com-puter readable media or computer readable storage device such as one or more non-transitory memories or other type of hardware-based storage devices, either local or net-worked. Further, such functions correspond to modules, which may be software, hardware, firmware, or any com-bination thereof. Multiple functions may be performed in one or more modules as desired, and the embodiments described are merely examples. The software may be executed on a digital signal processor, ASIC, microproces-sor, or other type of processor operating on a computer system, such as a personal computer, server, or other com-puter system, turning such computer system into a specifi-cally programmed machine.

Examples, as described herein, may include, or may operate on, processors, logic, or a number of components, modules, or mechanisms (herein "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. The software, when executed by the underlying hardware of the module, causes the hardware to perform the specified operations.

Accordingly, the term "module" is understood to encom-pass a tangible hardware and/or software entity, be that an entity that is physically constructed, specifically configured (e.g., hardwired), or temporarily (e.g., transitorily) config-ured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware pro-cessor, for example, to constitute a particular module at one instance of time and to constitute a different module at a different instance of time.

What is claimed:

1. A method of routing electric vehicles (EVs) for pick-up and delivery services using opportunity charging, compris-ing:

receiving a task request for package or person pick-up and drop-off, the task request including a pick-up location, a drop-off location, at least one of pick-up and drop-off timing, and at least one preference for package or person handling;

determining at least one candidate EV for the package or person pick-up and drop-off based on the task request;

performing a preliminary route analysis of one or more routes between the pick-up and drop-off locations based on the at least one handling preference and at least one of the pick-up and drop-off timing from the task request to determine an estimate of point-to-point travel time and electrical power consumption for the at least one candidate EV;

determining which EV of the at least one candidate EV is available during a time window of service determined from the at least one of the pick-up and drop-off timing in the task request;

determining which EV of the at least one EV available during the time window of service has sufficient state of charge to reach at least the pick-up location;

for each EV of the at least one candidate EV, performing routing calculations to develop an individual route between the pick-up location and the drop-off location containing a pick-up time estimate at the pick-up location, a drop-off time-estimate at the drop-off location, and predicted power consumption for the individual route;

assigning an EV of the at least one candidate EV to service the task request that has sufficient state of charge, with minimal recharging delay, to meet the predicted power consumption for the individual route for the assigned EV;

directing the EV to a charger on or near the individual route for the assigned EV; and managing charging of the EV at the charger to provide the EV with sufficient state of charge to meet the predicted power consumption, pick-up time estimate, and drop-off time estimate for the individual route for the assigned BV.

2. The method of claim 1, wherein assigning the EV to service the task comprises assigning the EV of the at least one candidate EV that minimizes the predicted power consumption.

3. The method of claim 1, further comprising determining a minimum state of charge threshold for each EV of the at least one candidate EV, identifying at least one charger on or near the individual route for each EV of the at least one candidate EV, and incorporating an opportunity charging session at the at least one charger into the routing calculations to maintain each EV of the at least one candidate EV above the minimum state of charge threshold.

4. The method of claim 3, wherein incorporating the opportunity charging session into the routing calculations includes estimating arrival and departure times at the at least one charger for the opportunity charging session and a total power transfer during the opportunity charging session.

5. The method of claim 1, wherein the at least one preference for package or person handling comprises at least one of type of EV, EV facilities, EV mileage and service costs, or type of service by the EV.

6. The method of claim 5, wherein the EV facilities include availability of at least one of refrigeration, a ramp, or a wheelchair lift.

7. The method of claim 5, wherein the type of service includes at least one of courier, limousine, taxi, public transportation, or cargo truck.

8. The method of claim 1, further comprising:

receiving a second task request for the assigned EV after the assigned EV has started along its individual route to service the task request;

recalculating a route of the assigned EV needed to complete each route segment including a pick-up location and a drop-off location of the second task request; and assigning the assigned EV to service the second task request when the assigned EV has sufficient state of charge to meet a predicted power consumption for the recalculated route for the assigned EV.

9. The method of claim 8, wherein recalculating the route of the assigned EV comprises:

performing a preliminary route analysis of one or more routes between the pick-up and drop-off locations of the second task request based on the at least one handling preference and at least one of the pick-up and drop-off timing from the second task request to determine an estimate of point-to-point travel time and electrical power consumption for the assigned EV;

determining whether the assigned EV is available during a time window of service determined from the at least one of the pick-up and drop-off timing in the second task request;

determining whether the assigned EV has sufficient state of charge to reach at least the pick-up location; and performing routing calculations to develop an updated individual route between the pick-up location and the drop-off location containing a pick-up time estimate at the pick-up location, a drop-off time-estimate at the drop-off location, and predicted power consumption for the updated individual route, wherein the updated individual route includes the pick-up location and drop-off location of the task request and the pick-up location and drop-off location of the second task request.

10. The method of claim 9, wherein the updated individual route is optimized to minimize at least one of travel distance and schedule disruption of the assigned EV.

11. A non-transitory computer readable medium comprising instructions stored thereon that when executed by one or more processors cause the one or more processors to implement a dispatch system for routing electric vehicles (EVs) for pick-up and delivery services using opportunity charging by performing operations including:

receiving a task request for package or person pick-up and drop-off, the task request including a pick-up location, a drop-off location, at least one of pick-up and drop-off timing, and at least one preference for package or person handling;

determining at least one candidate EV for the package or person pick-up and drop-off based on the task request;

performing a preliminary route analysis of one or more routes between the pick-up and drop-off locations based on the at least one handling preference and at least one of the pick-up and drop-off timing from the task request to determine an estimate of point-to-point travel time and electrical power consumption for the at least one candidate EV;

determining which EV of the at least one candidate EV is available during a time window of service determined from the at least one of the pick-up and drop-off timing in the task request;

determining which EV of the at least one EV available during the time window of service has sufficient state of charge to reach at least the pick-up location;

for each EV of the at least one candidate EV, performing routing calculations to develop an individual route between the pick-up location and the drop-off location containing a pick-up time estimate at the pick-up location, a drop-off time-estimate at the drop-off location, and predicted power consumption for the individual route; and assigning an EV of the at least one candidate EV to service the task request that has sufficient state of charge, with minimal recharging delay, to meet the predicted power consumption for the individual route for the assigned EV;

directing the BV to a charger on or near the individual route for the assigned EV; and

managing charging of the EV at the charger to provide the EV with sufficient state of charge to meet the predicted power consumption, pick-up time estimate, and drop-off time estimate for the individual route for the assigned EV.

12. The non-transitory computer readable medium of claim 11, wherein the instructions for assigning the EV to service the task comprise instructions that when executed by the one or more processors assign the EV of the at least one candidate EV that minimizes the predicted power consumption.

13. The non-transitory computer readable medium of claim 11, further comprising instructions that when executed by the one or more processors cause the one or more processors to perform additional operations including determining a minimum state of charge threshold for each EV of the at least one candidate EV, identifying at least one charger on or near the individual route for each EV of the at least one candidate EV, and incorporating an opportunity charging session at the at least one charger into the routing calculations to maintain each EV of the at least one candidate EV above the minimum state of charge threshold.

14. The non-transitory computer readable medium of claim 13, wherein the instructions for incorporating the opportunity charging session into the routing calculations includes instructions that when executed by the one or more processors provide estimates of arrival and departure times at the at least one charger for the opportunity charging session and a total power transfer during the opportunity charging session.

15. The non-transitory computer readable medium of claim 11, wherein the at least one preference for package or person handling comprises at least one of type of EV, EV facilities, EV mileage and service costs, or type of service by the EV.

16. The non-transitory computer readable medium of claim 15, wherein the EV facilities include availability of at least one of refrigeration, a ramp, or a wheelchair lift.

17. The non-transitory computer readable medium of claim 15, wherein the type of service includes at least one of courier, limousine, taxi, public transportation, or cargo truck.

18. The non-transitory computer readable medium of claim 11, further comprising instructions that when executed by the one or more processors cause the one or more processors to perform additional operations including:

receiving a second task request for the assigned EV after the assigned EV has started along its individual route to service the task request;

recalculating a route of the assigned EV needed to complete each route segment including a pick-up location and a drop-off location of the second task request; and assigning the assigned EV to service the second task request when the assigned EV has sufficient state of charge to meet a predicted power consumption for the recalculated route for the assigned EV.

19. The non-transitory computer readable medium of claim 18, wherein the instructions for recalculating the route of the assigned EV comprises instructions that when executed by the one or more processors cause the one or more processors to perform additional operations including:

performing a preliminary route analysis of one or more routes between the pick-up and drop-off locations of the second task request based on the at least one handling preference and at least one of the pick-up and drop-off timing from the second task request to determine an estimate of point-to-point travel time and electrical power consumption for the assigned EV;

determining whether the assigned EV is available during a time window of service determined from the at least one of the pick-up and drop-off timing in the second task request;

determining whether the assigned EV has sufficient state of charge to reach at least the pick-up location; and performing routing calculations to develop an updated individual route between the pick-up location and the drop-off location containing a pick-up time estimate at the pick-up location, a drop-off time-estimate at the drop-off location, and predicted power consumption for the updated individual route, wherein the updated individual route includes the pick-up location and drop-off location of the task request and the pick-up location and drop-off location of the second task request.

20. The non-transitory computer readable medium of claim 19, further comprising instructions that when executed by the one or more processors cause the one or more processors to perform additional operations including optimizing the updated individual route to minimize at least one of travel distance and schedule disruption of the assigned EV.

* * * * *